(12) United States Patent
Hisatsugu

(10) Patent No.: US 9,346,356 B2
(45) Date of Patent: May 24, 2016

(54) OPERATION INPUT DEVICE FOR VEHICLE

(75) Inventor: Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 334 days.

(21) Appl. No.: 13/292,402

(22) Filed: Nov. 9, 2011

(65) Prior Publication Data
US 2012/0123636 A1 May 17, 2012

(30) Foreign Application Priority Data

Nov. 12, 2010 (JP) ................................. 2010-253607

(51) Int. Cl.
G06F 3/033 (2013.01)
G06F 7/00 (2006.01)
B60K 35/00 (2006.01)

(52) U.S. Cl.
CPC ........... B60K 35/00 (2013.01); B60K 2350/925 (2013.01)

(58) Field of Classification Search
CPC ........... G06F 17/00; G06F 7/00; B60K 35/00; B60K 37/06
USPC ............................................. 701/36; 345/184
See application file for complete search history.

(56) References Cited

U.S. PATENT DOCUMENTS

| 5,479,191 | A * | 12/1995 | Komatsu ........................ 345/161 |
| 6,526,335 | B1 * | 2/2003 | Treyz et al. ........................ 701/1 |
| 6,710,771 | B1 * | 3/2004 | Yamaguchi et al. ........... 345/184 |
| 7,126,581 | B2 * | 10/2006 | Burk et al. ...................... 345/156 |
| 2001/0002126 | A1 * | 5/2001 | Rosenberg et al. ............ 345/156 |
| 2005/0273218 | A1 * | 12/2005 | Breed et al. ........................ 701/2 |
| 2007/0070072 | A1 * | 3/2007 | Templeman ................... 345/473 |
| 2007/0072662 | A1 * | 3/2007 | Templeman ....................... 463/6 |
| 2008/0068284 | A1 * | 3/2008 | Watanabe et al. .............. 345/1.1 |
| 2011/0167947 | A1 | 7/2011 | Hisatsugu |

FOREIGN PATENT DOCUMENTS

| DE | 10 2009 008731 | 10/2009 |
| JP | 07-40789 | 2/1995 |
| JP | 08-127267 | 5/1996 |
| JP | 10-275542 | 10/1998 |
| JP | 2004-185205 | 7/2004 |
| JP | 2004-224149 | 8/2004 |
| JP | 2007-290559 | 11/2007 |

OTHER PUBLICATIONS

Office action dated Dec. 12, 2012 in corresponding JP Application No. 2010-253607.
Office action dated Dec. 20, 2013 in corresponding Chinese Application No. 2011 10364599.3.
Office action dated Aug. 29, 2014 in corresponding Chinese Application No. 2011 10364599.3.

* cited by examiner

Primary Examiner — Behrang Badii
Assistant Examiner — Daniel L Greene
(74) Attorney, Agent, or Firm — Harness, Dickey & Pierce, P.L.C.

(57) ABSTRACT

An operation input device for a vehicle includes: a first operation unit for executing an operation of an in-vehicle device on the vehicle; and a second operation unit for executing a negative operation of the in-vehicle device so that the operation of the in-vehicle device is cancelled. An operation direction of the second operation unit has a directional component. The directional component of the operation direction of the second operation unit is opposite to an extending direction of an arm of a user, who sits down on a predetermined seat. The user extends the arm along with the extending direction in order to touch the operation input device.

16 Claims, 15 Drawing Sheets

OPERATION INPUT DEVICE FOR VEHICLE

CROSS REFERENCE TO RELATED APPLICATION

This application is based on Japanese Patent Application No. 2010-253607 filed on Nov. 12, 2010, the disclosure of which is incorporated herein by reference.

TECHNICAL FIELD

The present invention relates to an operation input device for inputting an operation signal to operate an in-vehicle device.

BACKGROUND

Conventionally, an operation input device for operating an in-vehicle device such as an air conditioner, an audio device, and a navigation device includes a first operation unit for operating the in-vehicle device such that the in-vehicle device is controlled to execute a specific function, a letter or the like is input into the in-vehicle device, or the in-vehicle device is controlled to proceed to the next function. Further, in addition to the first operation unit, the operation input device may include a second operation unit for operating the in-vehicle device to cancel the function input by the first operation unit such that the function of the in-vehicle device is stopped, cancelled or disabled, the input letter is deleted, or the status of the in-vehicle device is returned to the former state.

For example, JP-A-2004-224149 describes a central operation panel as the operation input device for operating the air conditioner, the audio device, and the navigation device. Multiple operation switches, i.e., the first and second operation units are arranged on the central operation panel. When one of the operation switches is operated by a user, the operation input device performs an operation corresponding to the operation switch. When the one of the operation switches is operated again, the operation input device stops performing the operation corresponding to the operation switch.

In the conventional operation input device, the first operation unit is disposed near the second operation unit. Further, an operational direction of the first operation unit is the same as the second operation unit. Further, the operational direction of the first and second operation units is the same as the direction, to which the user extends an arm and touches the operation units. Specifically, when the operation input device is the central operation panel, which is arranged on a center of an instrumental panel, the operational direction directs to a forward direction of the vehicle. When the operation input device is a remote control device arranged on a right or left side of the user, the operational direction directs to a downward direction of the vehicle.

Accordingly, when the user operates the first or second operation unit, it is necessary for the user to watch the first or second operation unit and to confirm a position and a type of the operation units. Thus, the user operates the first or second operation unit. In this case, the user may mistake the operation of the operation unit since the user operates without watching the operation unit or the user mistakenly touch the operation unit when the user extends the arm. In view of this point, the first operation unit may be arranged far from the second operation unit. Alternatively, the size or a protrusion amount of the second operation unit for executing a cancel operation may be reduced. Alternatively, the operation load of the second operation unit may be increased. Alternatively, it may be necessary to input the operation multiple times such as two times. However, in these cases, the operability or maneuvering feeling of the operation unit is reduced.

SUMMARY

In view of the above-described problem, it is an object of the present disclosure to provide an operation input device for a vehicle. Operability or maneuvering feeling of an operation unit is improved, and the operation input device is restricted from wrong operation.

According to an aspect of the present disclosure, an operation input device for a vehicle arranged at a predetermined position of a compartment of the vehicle, the operation input device includes: a first operation unit for executing an operation of an in-vehicle device on the vehicle; and a second operation unit for executing a negative operation of the in-vehicle device so that the operation of the in-vehicle device is cancelled. An operation direction of the second operation unit has a directional component. The directional component of the operation direction of the second operation unit is opposite to an extending direction of an arm of a user, who sits down on a predetermined seat. The user extends the arm along with the extending direction in order to touch the operation input device.

In the above device, when the user operates the second operation unit, it is necessary to operate the second operation unit in the operation direction having the directional component opposite to the extending direction of the arm of the user. Thus, an erroneous operation of the second operation unit is restricted even when the user operates the second operation unit without watching the second operation unit or even when the user carelessly extends the arm. Accordingly, erroneous operation such that the executing operation suddenly stops, or the input letter is mistakenly deleted is restricted. Further, it is not necessary to increase the dimensions of the second operation unit and to change a protrusion amount of the second operation unit. Thus, operability and operation feeling of the second operation unit are improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
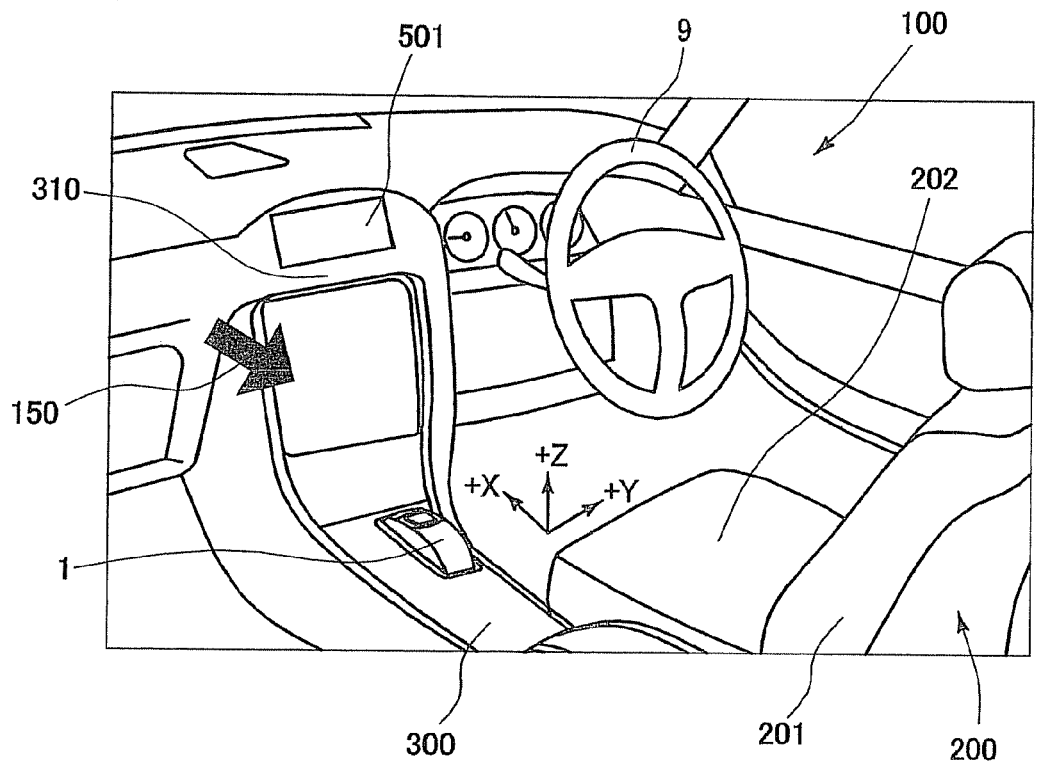
FIG. 1 is a diagram showing a compartment of a vehicle, in which a remote control device is arranged, according to a example embodiment.
Figure 2:
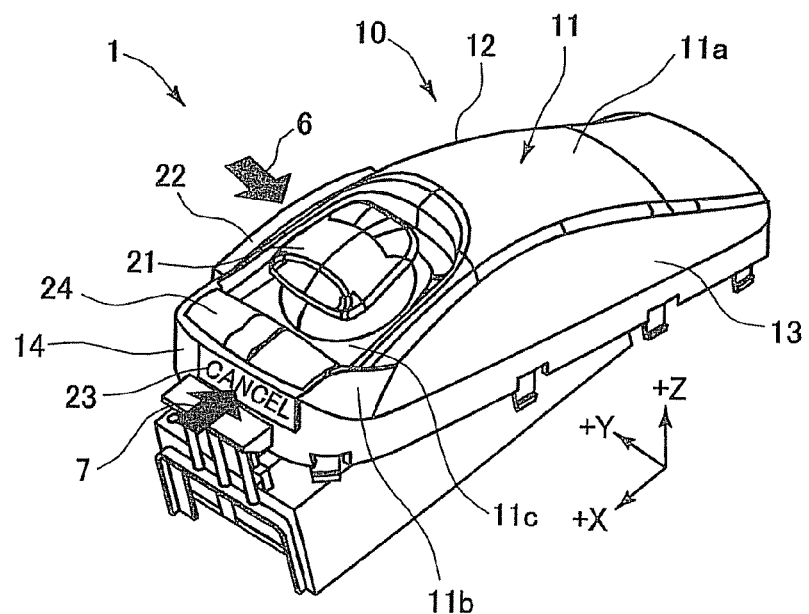
FIG. 2 is a diagram showing the remote control device.
Figure 3:
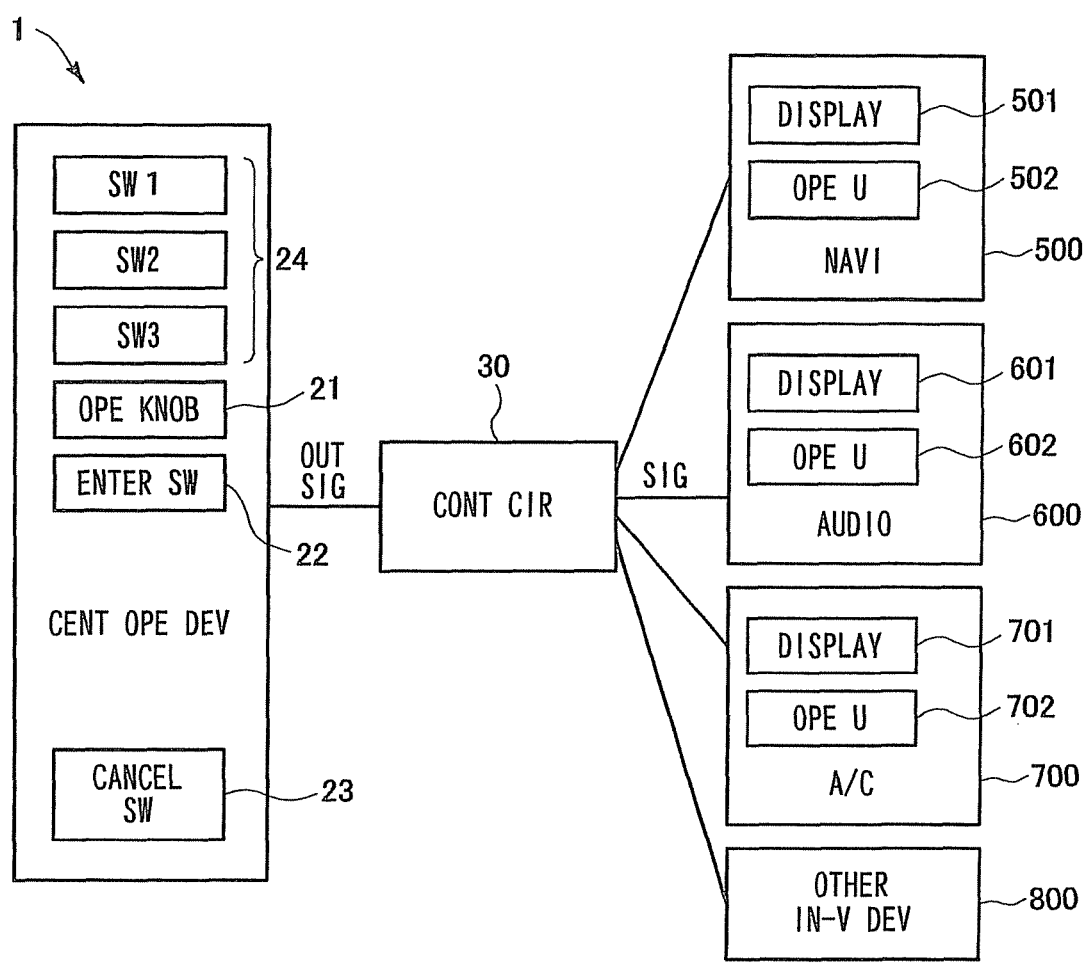
FIG. 3 is a block diagram showing the remote control device and in-vehicle devices connected to the remote control device.

An operation input device 1 for a vehicle according to an example embodiment of the present disclosure will be explained. Here, the operation input device 1 is arranged on a right side or a left side of a driver seat 200. FIG. 1 shows a remote control device 1 as the operation input device is arranged in a compartment 100 of the vehicle. FIG. 2 shows the remote control device 1 viewing from a let front side of the driver seat 200 along with an arrow 150. FIG. 3 shows an electric block diagram of the remote control device 1 and in-vehicle devices 500-800 connected to the remote control device 1.

As shown in FIG. 1, the remote control device 1 is arranged on a center console 300, which is disposed on a left side of the driver seat 200 when the vehicle is a right hand steering wheel vehicle. Specifically, the remote control device 1 is disposed on a front side of the compartment 100 from a seat back 201 of the driver seat 200. The height of the remote control device 1 in an up-down direction of the vehicle is almost the same as the height of a seat cushion 202 of the driver seat 200. A center panel 310 faces the driver seat 200, i.e., faces a rear side of the compartment 100. The center panel 310 is arranged on a left front side of the driver seat 200, and a lower portion of the center seat 310 is connected to the center console 300. A display 501 as a liquid crystal display of a navigation device 500 is arranged on the center panel 310. A display unit and an operation unit of an in-vehicle device such as audio device 600 and an air conditioner 700 in addition to the navigation device 500 are arranged on the center panel 310. A steering wheel 9 is arranged in front of the driver seat 200.

Here, a direction in the compartment 100 is defined as follows. A front-rear direction of the vehicle is defined as a X axis, and the front direction of the vehicle along with the X axis is defined as a positive side of the X axis, which is shown as +X in FIG. 1. A right-left direction of the vehicle is defined as a Y axis, and the right direction of the vehicle along with the Y axis is defined as a positive side of the Y axis, which is shown as +Y in FIG. 1. Here, the driver seat is disposed the right direction from the center console 300. An up-down direction of the vehicle is defined as a Z axis, and the up direction of the vehicle along with the Z axis is defined as a positive side of the Z axis, which is shown as +Z in FIG. 1.

Next, a construction of the remote control device 1 will be explained. As shown in FIG. 2, the remote control device 1 includes an operation body 10 and various switches 21-24, which are arranged on the operation body 10. The operation body 10 has an upper surface 11 directing to the +Z direction, a right side surface 12 directing to the +Y direction, a left side surface 13 directing to the −Y direction, and a front side surface 14 directing to the +X direction.

The upper surface 11 has a substantially rectangular shape having a long side along with the X axis. A part of the upper surface 11 disposed near a user is defined as a palm rest 11a. A palm of a left hand of the driver is laid on the palm rest 11a. The palm rest 11a is curved so that the driver easily lays the palm on the rest 11a. A part of the upper surface 11 disposed far from the user is defined as a front part 11b. An opening 11c is formed on the front part 11b. An operation knob 21 is exposed from the opening 11c. The operation knob 21 is slidably on a plane of the upper surface 11. The operation knob 21 is an operation unit, which is operated by the driver so that a cursor displayed on the display unit 501 is moved. A reaction force is applied to the operation knob 21 by a reaction force applying mechanism (not shown).

One or more push switches 24 are disposed on a front end of the front part 11b of the upper surface 11. The driver pushes the push switch 24 as an operation unit for operating the in-vehicle devices 500-800. Specifically, the push switch 24 is used for switching a display screen of the display unit 501 to a menu screen or a map screen. The operation direction of the push switch 24 is a down direction of the vehicle in the vertical direction, i.e., the −Z direction.

The right side surface 12 of the body 10 is connected to a long side of the rectangular shape of the upper surface 11 in the +Y direction. The right side surface 12 provides a right side of the body 10, which is directed to the +Y direction. An enter switch 22 as a push switch is arranged on the right side surface 12. The user pushes the enter switch 22 in the −Y direction, i.e., a direction perpendicular to the right side surface 12. In FIG. 2, the operation direction of the enter switch 22 is shown as an arrow 6. Thus, the enter switch 22 has the operation direction 6. The enter switch 22 is used for operating the in-vehicle device 500-800. Specifically, the enter switch 22 is used for executing determination operation, for example, for determining execution of a specific process and for determining confirmation of input letter.

The left side surface 13 of the body 10 is connected to a long side of the rectangular shape of the upper surface 11 in the −Y direction. The left side surface 13 provides a left side of the body 10, which is directed to the −Y direction.

The front side surface 14 of the body 10 is connected to a short side of the rectangular shape of the upper surface 11 in the +x direction. The front side surface 14 provides a front side of the body 10, which is directed to the −X direction. The front side of the body 10 is disposed on a far side of the user. A cancel switch 23 as a push switch is disposed on the front side surface 14. The user pushes the cancel switch 23 in the −X direction, i.e., a direction perpendicular to the front side surface 14. In FIG. 2, the operation direction of the cancel switch 23 is shown as an arrow 7. Thus, the cancel switch 23 has the operation direction 7. The cancel switch 23 is used for canceling an operation of each operation unit such as the operation knob 21, the enter switch 22 and the push switch 24. The cancel switch 23 is used for operating the in-vehicle device 500-800 to cancel the operation. Specifically, the cancel switch 23 is used for performing a cancellation operation such that the function of the in-vehicle device 500-800 is stopped, cancelled, deactivated or disabled, the input letter is deleted or corrected, or the status of the in-vehicle device 500-800 is returned to a former state. The enter switch 22 and the cancel switch 23 are push switches having the same shape, the same size, the same protrusion amount, and the same operational load.

As shown in FIG. 3, the remote control device 1 is electrically connected to each in-vehicle device 500-800 via the control circuit 30. When one of the operation units 21-24 in the remote control device 1 is operated, the remote control device 1 outputs an operation signal corresponding to the one of the operation units 21-24. The operation signal is input into the control circuit 30. Specifically, a detection unit (not shown) is arranged in each operation unit 21-24 so that the detection unit detects the operation of the operation unit 21-24. Specifically, each detection unit generates the operation signal corresponding to the operation unit 21-24. Then, the operation signal is input into the control circuit 30. For example, when the user pushes the cancel switch 23, the operation signal showing the operation of the cancel switch 23 is input into the control circuit 30. Further, for example, when the user operates the operation knob 21, the operation signal showing the operation direction and the operation amount is input into the control circuit 30. Here, the detection unit is a conventional device such as a rubber contact point, a metal contact point, a tact switch, an optical sensor, a magnetic sensor, a pressure-sensitive sensor, and an electro-static sensor.

The control circuit 30 is a conventional micro computer having a CPU, a ROM, a RAM and the like. The control circuit 30 executes a program stored in the ROM or the like so that the control circuit 30 controls the in-vehicle device 500-800. Further, the control circuit 30 controls the display 501 of the navigation device 500 to display various operation images for supporting the operation of the remote control device 1. The operation images are, for example, an arrow image showing the operation direction and a cursor image. More specifically, when the control circuit 30 receives the operation signal from each operation unit 21-24 in the remote control device 1, the control circuit 30 controls the in-vehicle device 500-800 to execute the function corresponding to the operation signal. For example, when the control circuit 30 receives the operation signal from the enter switch 22, the control circuit 30 controls the in-vehicle device 500-800 to execute a specific process, or to input a specific letter. Further, when the control circuit 30 receives the operation signal of the cancel switch 23, the control circuit 30 controls the in-vehicle device 500-800 to stop or cancel the process, which is currently executed, or to delete or correct the input letter. Here, the operation image displayed on the display 501 will be explained later.

The navigation device 500 as the in-vehicle device includes the display 501 and the operation unit 502. The navigation device 500 displays the map around the current position of the vehicle on the display 501. Further, the navigation device 500 guides the driver along with a route to a destination. The display 501 is arranged on the center panel 310, as shown in FIG. 1. In addition to the map around the current position of the vehicle, a setting screen for setting the destination, a menu screen and the like are displayed on the display 501. The operation unit 502 is a mechanical operation unit such as a push switch and/or a touch switch. The push switch is arranged around the display 501 of the center panel 310. The user can touch and operate the touch switch, and the touch switch is integrally formed on the display 501. With using the operation unit 502, the user inputs a letter when the destination is set, a selection item in the menu screen is selected, and a scale of the map is changed. Thus, the user operates the navigation device 500 with using the operation unit 502.

The audio device 600 as the in-vehicle device includes a display unit 601 and an operation unit 602. The audio device 600 replays music stored in a CD, a DVD or the like. Alternatively, the audio device 600 receives a radio electric wave, and outputs radio sound corresponding to the received wave. The display unit 601 is arranged on the center panel 310. In FIG. 1, the display unit 601 is not shown. The display unit 601 displays information about music, which is currently replayed, and information about a radio station, which is currently selected. The information about music includes a song title, a name of a singer and the like. The information about the radio station includes a name of the radio station, a reception frequency and the like. The operation unit 602 is a mechanical operation unit such as a push switch and/or a touch switch. The push switch is arranged around the display unit 601 of the center panel 310. The user can touch and operate the touch switch, and the touch switch is integrally formed on the display unit 601. With using the operation unit 602, the user selects the music. Thus, the user operates the audio device 600 with using the operation unit 602.

The air conditioner 700 as the in-vehicle device includes a display unit 701 and an operation unit 702. The air conditioner 700 controls the atmosphere in the compartment. The display unit 701 is arranged on the center panel 310. The display unit 701 is not shown in FIG. 1. The display unit 701 displays a current status of the air conditioning such as a setting temperature, a mode of the air conditioning, i.e., air cooling mode or air heating mode, air blow amount, and a direction of air blow. The operation unit 702 is a mechanical operation unit such as a push switch and for a touch switch. The push switch is arranged around the display unit 701 of the center panel 310. The user can touch and operate the touch switch, and the touch switch is integrally formed on the display unit 701. With using the operation unit 702, the user sets each parameter of the air conditioning. Thus, the user operates the air conditioner 700 with using the operation unit 702.

The display units 501, 601, 701 of the in-vehicle devices 500-700 may be integrated into one display unit. For example, the display unit 601 of the audio device 600 and the display unit 701 of the air conditioner 700 may be provided by the display unit 501 of the navigation device 500 in common use. In this case, the operation unit 602 of the audio device 600 and the operation unit 702 of the air conditioner 700 may be provided by the operation unit 502 of the navigation device 500, i.e., the touch switch integrally formed on the display unit 501.

In addition to the in-vehicle devices 500-700, other in-vehicle devices 800 such as a device for turning on and off a light of the vehicle, and a device for opening and closing a door window of the vehicle are mounted on the vehicle. Other devices may include a display unit and an operation unit if necessary.

Figure 4A:
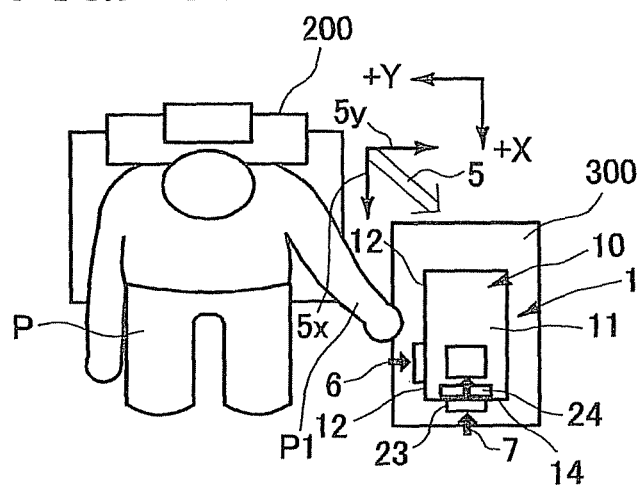
FIGS. 4A to 4C are diagrams showing a relationship between an extending direction of an arm of a user and an operational direction of the remote control device.
Figure 4B:
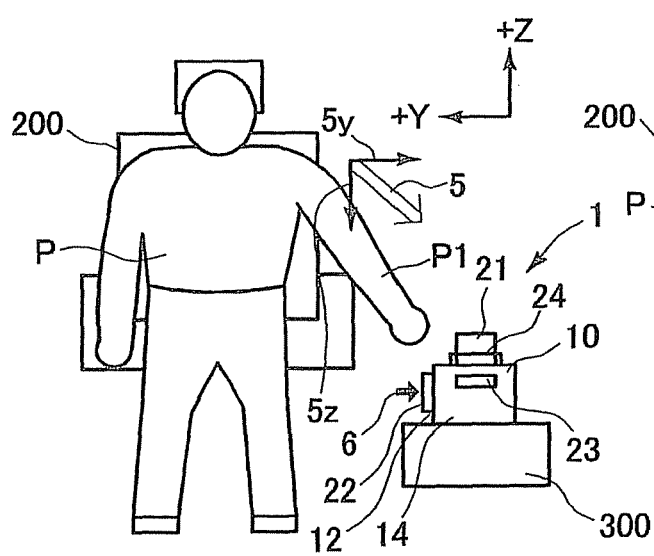
Figure 4C:
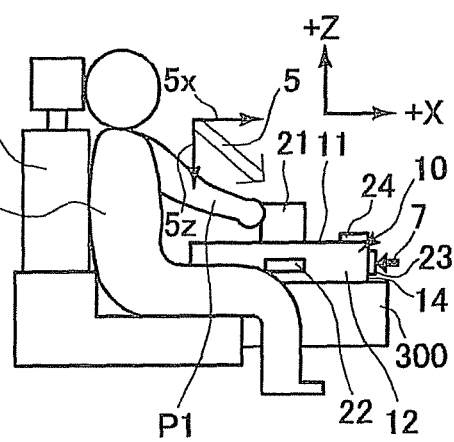

Next, a relationship between an extending direction of an arm of a user and an operational direction of each operation unit 21-24 of the remote control device will be explained as follows. When the user, i.e., the driver of the vehicle operates the remote control device 1, the user extends the arm toward the remote control device 1 along with the extending direction. FIGS. 4A to 4C show a relationship between the extending direction of the arm of the driver P and the operational direction of the remote control device 1 when the driver P sits down on the driver seat. Specifically, FIG. 4A shows the driver P and the remote control device 1 viewing from an up side of the driver seat. FIG. 4B shows the driver P and the remote control device 1 viewing from a front side of the driver seat. FIG. 4C shows the driver P and the remote control device 1 viewing from a right side of the driver seat.

In FIGS. 4A to 4C, the X axis, the Y axis and the Z axis are shown. In FIGS. 4A to 4C, the extending direction of the left arm P1 of the driver P is defined as a direction 5. A X component of the extending direction 5 is defined as 5$x$, a Y component of the extending direction 5 is defined as 5$y$, and a Z component of the extending direction 5 is defined as 5$z$. Further, in FIGS. 4A to 4C, the operation direction of the enter switch 22 in the remote control device 1 is defined as a direction 6, and the operation direction of the cancel switch 23 is defined as a direction 7.

When the driver P extends the left arm P1 toward the remote control device 1, the left arm P1 extends forward with respect to the left shoulder of the driver P1 as a reference point, as shown in FIGS. 4A and 4C. The forward direction is equal to the +X direction. Specifically, the X component 5$x$ of the direction 5 is the +X direction. With regard to the right-left direction (i.e., the Y direction), the left arm P1 extends toward a passenger seat with respect to the left shoulder of the driver P1 as a reference point, as shown in FIGS. 4A and 4B. The direction to the passenger seat is the −Y direction. Specifically, the Y component 5$y$ of the direction 5 is the −Y direction. With regard to the up down direction (i.e., the Z direction), the left arm P1 extends downward with respect to the left shoulder of the driver P1 as a reference point, as shown in FIGS. 4B and 4B. The downward direction is the −Z direction. Specifically, the Z component 5$z$ of the direction 5 is the −Z direction.

The enter switch 22 is arranged on the right side surface 12 of the body 10. The operation direction 6 is a direction toward the passenger seat (i.e., −Y direction). Thus, the operation direction 6 of the enter switch 22 is equal to the Y component 5$y$ of the extending direction 5 of the left arm P1 of the driver P. Thus, the driver P extends the left arm P1 toward the remote control device 1 so that the driver P easily operate the enter switch 22.

The cancel switch 23 is arranged on the front side surface 14 of the body 10. The operation direction 7 of the cancel switch 23 is the rear direction of the vehicle (i.e., −X direction), as shown in FIGS. 4A and 4C. Thus, the operation direction 7 of the cancel switch 23 is opposite to the X component 5$x$ of the extending direction 5 of the left arm P1 of the driver P. Thus, the operation direction 7 of the cancel switch 23 has a directional component, which is opposite to the extending direction 5 of the left arm P1. Thus, when the driver P extends the left arm P1 in order to operate without watching the cancel switch 23 or the other operation units or when the user mistakenly touch the cancel switch 23 or the other operation units and extend the left arm, the user does not mistake the operation of the cancel switch 23. Thus, the in-vehicle device 500-800 is restricted from being operated negatively. Thus, the in-vehicle device 500-800 is restricted from stopping, canceling, deactivating or disabling the function of the in-vehicle device 500-800. Alternatively, the in-vehicle device 500-800 is restricted from deleting the input letter or from returning to the former state of the in-vehicle device 500-800.

The operation knob 21 arranged on the remote control device 1 is slidably supported in the plane of the upper surface 11 of the body 10. Thus, the operation direction of the operation knob 21 is on the plane of the upper surface 11. Accordingly, there are two cases. In one case, the operation direction of the operation knob 21 has a directional component, which is the same as the extending direction 5 of the left arm P1 of the driver P. In the other case, the operation direction of the operation knob 21 has a directional component, which is opposite to the extending direction 5 of the left arm P1 of the driver P. Further, the push switch 24 arranged on the remote control device 1 is disposed on the upper surface 11 of the body 10. The operation direction of the push switch 24 is a downward direction of the vehicle (i.e., −Z direction). Accordingly, the operation direction of the push switch 24 has a directional component, which is the same as the extending direction 5 of the left arm P1 of the driver P. Here, the directional component of the push switch 24 is equal to the Z component 5$z$ in the Z axis.

Figure 5A:
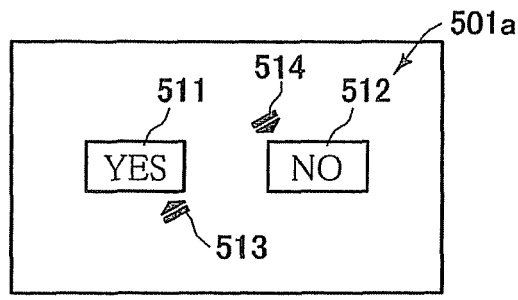
FIG. 5A is a diagram showing an operation screen of a yes-no selection operation displayed on a display unit.

Next, when the navigation device 500 is operated with using the remote control device 1, the operation screen displayed on the display unit 501 will be explained. Here, FIGS. 5A to 5D show four operation screens on the display unit 501. FIG. 5A shows an operation screen 501$a$ of a yes-no selection operation displayed on a display unit. The operation screen 501$a$ is displayed when the user determines whether the navigation device 500 performs a specific process.

As shown in FIG. 5A, on the operation screen 501$a$, a YES image 511 showing an operation button of "YES" and a NO image 512 showing an operation button of "NO" are displayed along with the right-left direction. The YES image 511 is selected in a case where the navigation device 500 performs a specific process. The YES image 511 corresponds to the enter switch 22 of the remote control device 1. When the enter switch 22 is operated under a condition that the operation screen 501$a$ is displayed, the YES image 511 is selected.

The NO image 512 is selected when the navigation device 500 does not perform the specific process. Specifically, when the execution of the specific process in the navigation device 500 is stopped or cancelled, the NO image 512 is selected. The No image 512 corresponds to the cancel switch 23 of the remote control device 1. Thus, when the cancel switch 23 is operated under a condition that the operation screen 501$a$ is displayed, the NO image 512 is selected. Here, even when the user directly touches the YES image 511 and the No image 512, the YES image 511 and the No image 512 are also selected.

The operation screen 501$a$ includes a first arrow image 513, which is displayed and accompanied with the YES image 511. The first arrow image 513 shows the operation direction of the remote control device 1 when the YES image 511 is selected by using the remote control device 1. Specifically, the first arrow image 513 is displayed under the YES image 511. The first arrow image 513 directs from the lower side to the upper side of the operation screen 501$a$. This arrangement corresponds to a feature such that the operation direction 6 of the enter switch 22 corresponding to the YES image 511 has the same directional component as the extending direction 5 of the left arm P1 of the driver P. Accordingly, when the driver P sees the first arrow image 513, and the driver P operates the remote control device 1, i.e., the enter switch 22, along with the direction equal to the extending direction of the left arm P1. Thus, it is easy for the driver P to recognize the selection of the YES image 511.

The operation screen 501a includes a second arrow image 514, which is displayed and accompanied with the NO image 512. The second arrow image 514 shows the operation direction of the remote control device 1 when the NO image 512 is selected by using the remote control device 1. Specifically, the second arrow image 514 is displayed over the NO image 512. The second arrow image 514 directs from the upper side to the lower side of the operation screen 501a. This arrangement corresponds to a feature such that the operation direction 7 of the cancel switch 23 corresponding to the NO image 512 has the opposite directional component to the extending direction 5 of the left arm P1 of the driver P. Accordingly, when the driver P sees the second arrow image 514, and the driver P operates the remote control device 1, i.e., the cancel switch 23, along with the opposite direction to the extending direction of the left arm P1. Thus, it is easy for the driver P to recognize the selection of the NO image 512.

Figure 5B:
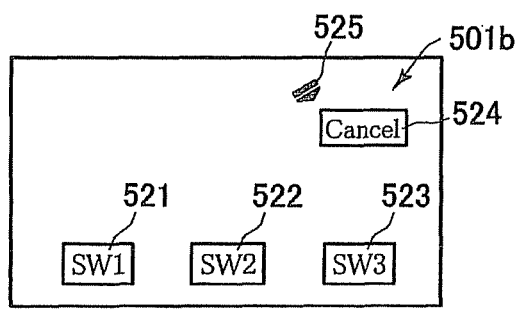
FIG. 5B is a diagram showing an operation screen of a back-return operation displayed on the display unit.

FIG. 5B shows an operation screen 501b, which includes a cancel image 524. The cancel image 524 shows the cancel button for stopping the display of the current screen on the display unit 501 and for returning to the former screen. Specifically, the operation screen 501b includes a first operation image 521, a second operation image 522 and a third operation image 523, which are aligned in the right-left direction. The first operation image 521 represents a first switch SW1, the second operation image 522 represents a second switch SW2, and the third operation image 523 represents a third switch SW3. When the user operates a switch SW1-SW3, the navigation device 500 executes a specific process. The operation images 521-523 correspond to the push switch 24 of the remote control device 1 in FIGS. 2 and 3. Thus, when the operation screen 501b is displayed, and the user operates the push switch 24 corresponding to the first switch SW1, the first operation image 521 is selected. When the user operates the push switch 24 corresponding to the second switch SW2, the second operation image 522 is selected. When the user operates the push switch 24 corresponding to the third switch SW3, the third operation image 523 is selected.

The cancel screen 524 is displayed on the right upper side of the operation screen 501b. The cancel image 524 corresponds to the cancel switch 23 of the remote control device 1. Specifically, under a condition that the operation screen 501b is displayed, when the cancel switch 23 is operated, the cancel image 524 is selected. In case of the operation screen 501b in FIG. 5B, similar to FIG. 5A, when the user directly touches one of the images 521-524, the one of the images 521-524 is selected.

Further, similar to a case in FIG. 5A, the operation screen 501b includes an arrow image 525, which is displayed and accompanied with the cancel image 524. The arrow image 525 shows the operation direction of the remote control device 1 when the cancel image 524 is selected by using the remote control device 1. Specifically, the arrow image 525 is displayed over the cancel image 525. Accordingly, when the driver P sees the arrow image 525, and the driver P operates the remote control device 1, i.e., the cancel switch 23, along with the direction opposite to the extending direction of the left arm P1. Thus, it is easy for the driver P to recognize the selection of the cancel image 524.

Figure 5C:
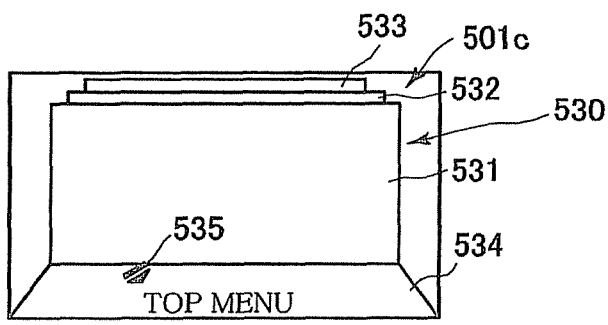
FIG. 5C is a diagram showing an operation screen of a up-down operation of a hierarchy level displayed on the display unit.

FIG. 5C shows the operation screen 501c having multiple screen images, which are displayed in a hierarchical display manner. Specifically, the operation screen 501c has a hierarchical screen image 530 having three screen images, which are stacked in a depth direction of the screen 501c, i.e., layered in the hierarchical display manner. In the hierarchical screen image 530, when the operation knob 21 of the remote control device 1 is operated, a current layer screen image is switched to an upper layer screen image 531-533 (i.e., the hierarchy is up), or the current layer screen image is switched to a lower layer screen image 531-533 (i.e., the hierarchy is down).

The operation screen 501c includes a top menu image 534, which is disposed on a lower side of the hierarchical screen image 530. When the user selects the top menu image 534, the current layer screen image is returned to the top menu screen as the top layer screen image of the hierarchical screen image 530. The top menu image 534 corresponds to the cancel switch 23 of the remote control device 1. Specifically, under a condition that the operation screen 501c is displayed, when the cancel switch 23 is operated, the top menu image 534 is selected. Here, when the user directly touches the top menu image 534, the top menu image is selected.

The operation screen 501c includes an arrow image 535, which is displayed and accompanied with the top menu image 534. The arrow image 535 shows the operation direction of the remote control device 1 when the top menu image 534 is selected by using the remote control device 1. Specifically, the arrow image 535 is displayed over the top menu image 535. Accordingly, when the driver P sees the arrow image 535, and the driver P operates the remote control device 1, i.e., the cancel switch 23, along with the direction opposite to the extending direction of the left arm P1. Thus, it is easy for the driver P to recognize the selection of the top menu image 534.

Figure 5D:
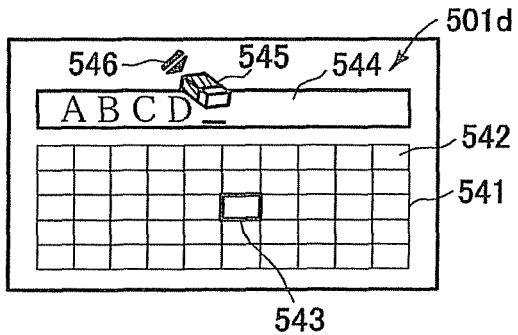
FIG. 5D is a diagram showing an operation screen of a delete-correction operation displayed on the display unit.

FIG. 5D shows an operation screen 501d as a letter input screen for inputting a letter when a destination is set. Specifically, the operation screen 501d includes a character arrangement image 541, in which multiple character images 542 such as alphabets and Japanese kana words are arranged in horizontal and vertical directions. A cursor image 543 is displayed and accompanied with one of the character images 542 in the character arrangement image 541. Further, a display column image 544 is disposed over the character arrangement image 541. The input character is displayed in the display column image 544.

When the driver P operates the operation knob 21 of the remote control device 1, the cursor 543 is moved to a certain position of the character image 542. When the driver P operates the enter switch 22, the character image 542 corresponding to the cursor 543 is input into the navigation device 500. The input character is displayed in the display column image 544. Here, when the user directly touches the character image 542, the character image 542 is input into the navigation device 500.

The display column in the display column image 544 includes an eraser image 545 for deleting and correcting the input character (e.g., a character input immediately) when the eraser image 545 is selected. The eraser image 545 corresponds to the cancel switch 23 of the remote control device 1. Specifically, under a condition that the operation screen 501d is displayed, when the cancel switch 23 is operated, the eraser image 545 is selected. Here, when the user directly touches the eraser image 545, the eraser image 545 is selected.

Similar to FIGS. 5A to 5C, an arrow image 546 is displayed and accompanied with the eraser image 545. The arrow image 546 shows the operation direction of the remote control device 1 when the eraser image 545 is selected by using the remote control device 1. Specifically, the arrow image 546 is displayed over the eraser image 545. Accordingly, when the driver P sees the arrow image 546, and the driver P operates the remote control device 1, i.e., the cancel switch 23, along with the direction opposite to the extending direction of the left arm P1. Thus, it is easy for the driver P to recognize the selection of the eraser image 545.

FIGS. 5A to 5D shows example of operation screens displayed on the display unit 501 of the navigation device 500. Operation screens displayed on the display unit 601, 701 of other in-vehicle devices 600-800 include arrow images, each of which shows an operation direction of the cancel switch 23.

In the above embodiment, the control circuit 30 and the remote control device 1 correspond to an in-vehicle device input operation apparatus. The operation knob 21, the enter switch 22 and the push switch 24 correspond to the first operation unit. The cancel switch 23 corresponds to the second operation unit. The control circuit 30 corresponds to a display controller. The display units 501, 601, 701 correspond to a display.

(1st Modification)

Figure 6A:
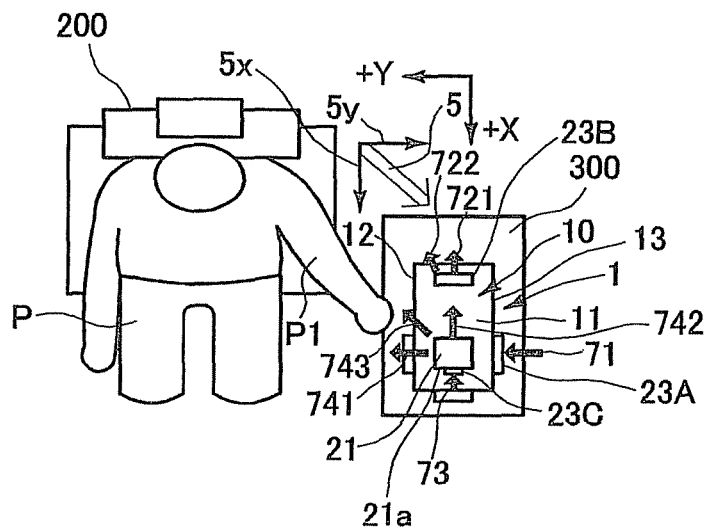
FIGS. 6A to 6C are diagrams showing an operational direction of a cancel switch arranged at different position.
Figure 6B:
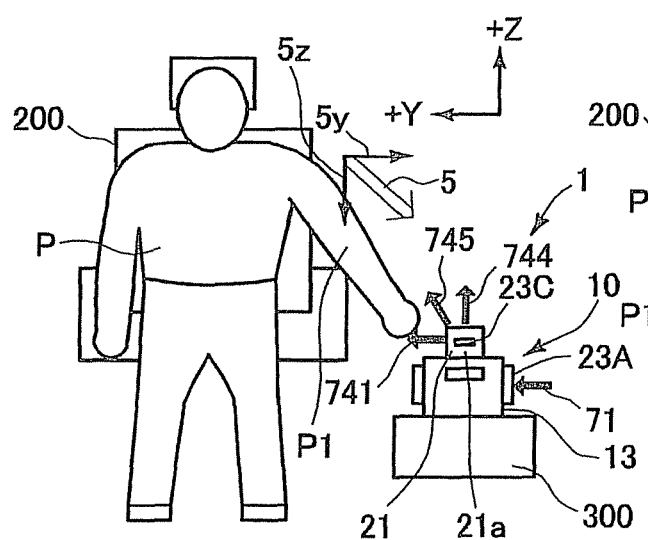
Figure 6C:
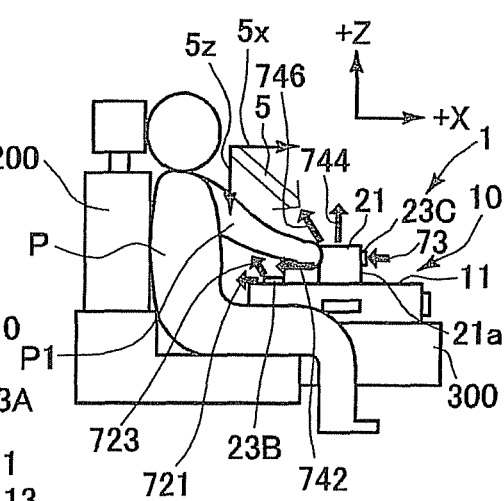

In the above embodiment, the operation unit such as the cancel switch 23 for executing a negative operation of the in-vehicle device is arranged on the front side surface 14 of the body 10. Thus, the operation direction 7 of the cancel switch 23 is the rear direction of the vehicle (i.e., −X direction). Alternatively, the operation unit for executing the negative operation may have any operation direction as long as the operation direction includes a directional component opposite to the extending direction of the left arm of the driver. Further, the operation unit may be arranged on any position of the operation body. Here, FIGS. 6A to 6C show an arrangement position of the cancel switch and the operation direction of the cancel switch for executing the negative operation. Specifically, similar to FIGS. 4A to 4C, FIGS. 6A to 6C show the driver P and the remote control device 1 viewing from various directions.

Figure 7:
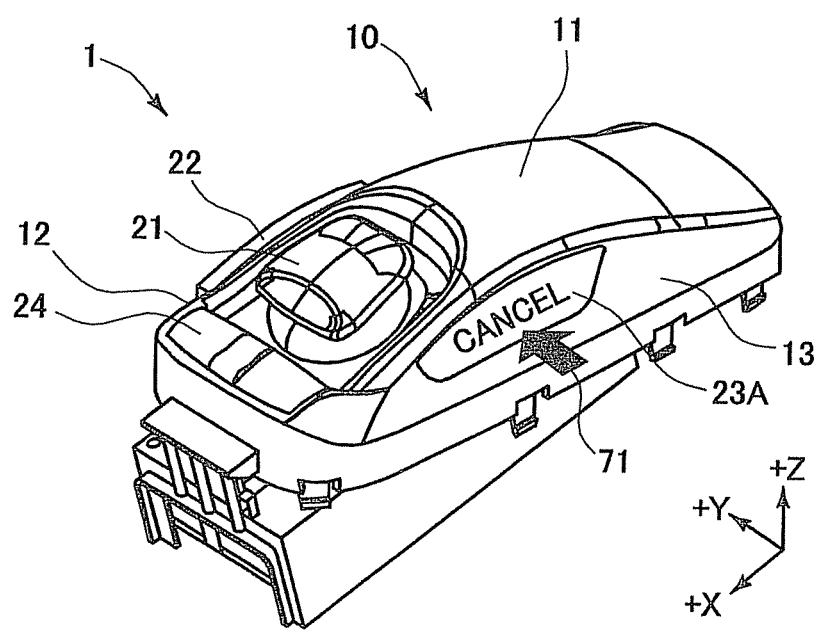
FIG. 7 is a diagram showing another remote control device according to a modification of the example embodiment.

As shown in FIGS. 6A to 6C, the cancel switch 23A having the same function as the cancel switch 23 may be arranged on the left side surface 13 directing to the −Y direction of the body 10. FIG. 7 shows the remote control device 1 having the cancel switch 23A on the left side surface 13 of the body 10. In FIG. 7, the cancel switch 23A is a push switch, which is pushed in the +Y direction (i.e., the direction toward the driving seat 200). Thus, the operation direction 71 of the cancel switch 23A is opposite to the directional component 5y of the extending direction 5 of the left arm P1, which is the −Y direction. Thus, the wrong operation of the cancel switch 23A is restricted. Further, since the left side surface 13 does not face the driver seat 200, the erroneous operation of the cancel switch 23A is restricted.

Figure 8A:
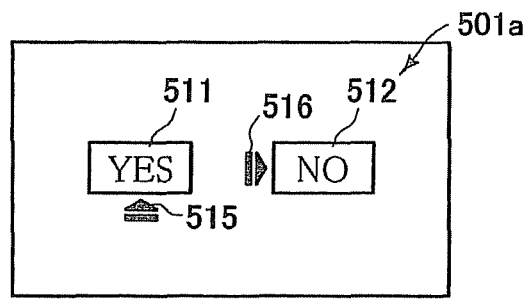
FIG. 8A is a diagram showing an operation screen of a yes-no selection operation displayed on a display unit.

When the cancel switch 23A is arranged on the left side surface 13 of the body 10, the arrow image showing the operation direction of the cancel switch 23A is displayed on the operation screen of the display unit of each in-vehicle device. Here, FIGS. 8A to 8D show the operation screens of the display unit 501 in the navigation device 500. FIG. 8A shows an operation screen 501a of a yes-no selection operation corresponding to FIG. 5A. As shown in FIG. 8A, the YES image 511 corresponding to the enter switch 22 and the NO image 512 corresponding to the cancel switch 23A are displayed on the operation screen 501a. The first arrow image 515 showing the operation direction of the remote control device 1 in a case where the YES image 511 is selected is displayed and accompanied with the YES image 511. The second arrow image 516, which is displayed and accompanied with the NO image 512. The second arrow image 516 shows the operation direction of the remote control device 1 when the NO image 512 is selected by using the remote control device 1. The second arrow image 516 is arranged on the left side of the NO image 512. The second arrow image 516 directs from the left side to the right side of the operation screen 501 so that the second arrow image 516 is directed in the horizontal direction.

Figure 8B:
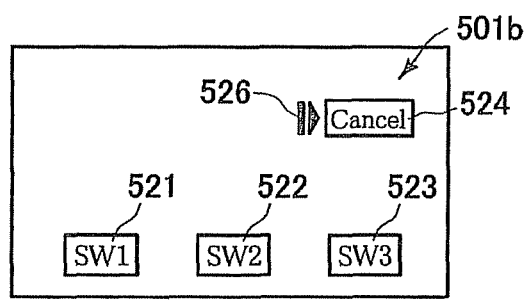
FIG. 8B is a diagram showing an operation screen of a back-return operation displayed on the display unit.

FIG. 8B shows an operation screen of a back-return operation, which corresponds to FIG. 5B. The cancel image 524 corresponding to the cancel switch 23A is displayed on the operation image 501b. The arrow image 526 is displayed and accompanied with the cancel image 524. The arrow image 526 is directed in the horizontal direction.

Figure 8C:
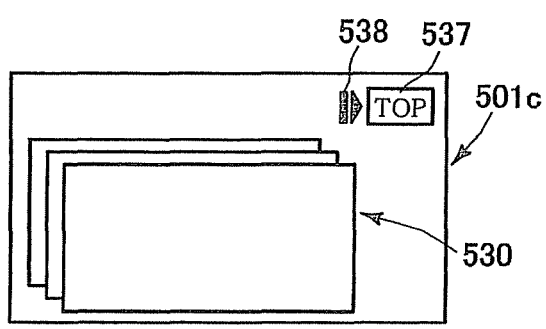
FIG. 8C is a diagram showing an operation screen of a up-down operation of a hierarchy level displayed on the display unit.

FIG. 8C shows an operation screen of a up-down operation of a hierarchy level, which corresponds to FIG. 5C. The operation screen 501c includes a top menu image 537, which corresponds to the cancel switch 23A. In FIG. 8C, the top menu image 537 is displayed on the right upper side of the operation screen 501c. The arrow image 538 is displayed and accompanied with the top menu image 537. The arrow image 538 is directed in the horizontal direction.

Figure 8D:
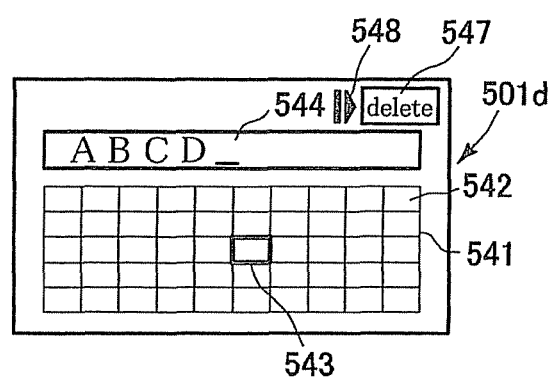
FIG. 8D is a diagram showing an operation screen of a delete-correction operation displayed on the display unit, according to the modification of the example embodiment.

FIG. 8D shows an operation screen of a delete-correction operation, which corresponds to FIG. 5D. The delete image 547 instead of the eraser image 545 is displayed on the right upper side of the operation screen 501d. The delete image 547 corresponds to the eraser image 545. When the cancel switch 23A is operated, the delete image 547 is selected so that the letter displayed in the display column in the display column image 544. The arrow image 548 is displayed and accompanied with the delete image 547. The arrow image 548 is directed in the horizontal direction.

Thus, in each operation screen 501a-501d, each arrow image 516, 526, 538, 548 is displayed. Thus, the driver P easily recognizes that each image 512, 524, 537, 547 is selected when the driver P operates the remote control device 1, i.e., the cancel switch 23A in the +Y direction.

Here, other cancel switches other than the cancel switch 23A may be arranged at various positions of the body 10. Specifically, as shown in FIGS. 6A to 6C, a cancel switch 23B having the same function as the cancel switch 23 may be arranged on the rear side of the upper surface 11 of the body 10, which is a near side of the driver P. As shown in FIG. 6A, the cancel switch 23B is operated by the driver P in the operation direction 722 toward the driver P (which is the operation direction between the −X direction and the +Y direction) or the operation direction 721 toward the rear side of the vehicle (which is the −X direction). Specifically, the cancel switch 23B faces a direction tilted from the operation direction 721, 722. As shown in FIG. 6C, the cancel switch 23B may be operated in the operation direction 723 having the +Z directional component so that the driver P pulls up the cancel switch 23b toward the driver P. Thus, the operation direction 721-723 of the cancel switch 23B is opposite to the directional component 5x (i.e., the +X direction), the directional component 5y (i.e., the −Y direction), and the directional component 5z (i.e., the −Z direction) of the extending direction 5 of the left arm P1 of the driver P. thus, the erroneous operation of the cancel switch 23B is restricted.

Further, as shown in FIG. 6, a cancel switch 23C having the same function as the cancel switch 23 may be arranged on the front side 21a of the operation knob 21, which faces the +X direction. The cancel switch 23C is a push switch, which is operated in a direction perpendicular to the front side 21a so that the driver P pushes cancel switch 23C in the −X direction. Thus, the operation direction 73 of the cancel switch 23C includes a directional component opposite to the extending direction of the left arm P1 of the driver P. Thus, the erroneous operation of the cancel switch 23C is restricted. Further, since the cancel switch 23C is arranged on the operation knob 21, the driver P can operate the cancel switch 23C when the driver P operates the operation knob 21. Accordingly, the operability is improved.

The operation knob 21 may execute the negative operation. In this case, when the driver P operates the operation knob 21 in the operation direction 741, 742, 743, 744, 745, 746 having at least one directional component of the −X direction, the +Y direction or the +Z direction, which is opposite to the extending direction 5, the negative operation is executed. Thus, erroneous negative operation is restricted. Here, the cancel switch 23A-23C corresponds to the second operation unit. Further, the operation knob 21 may correspond to the second operation unit.

(2nd Modification)

In the above embodiment, the remote control device 1 is used as the operation input device for the vehicle. The remote control device 1 includes the operation units 21-24 arranged on the body 10 having the elongated shape in the X direction. Alternatively, the operation input device for the vehicle may be a different type of the device. Here, FIGS. 9A to 9F show various types of the remote control devices 1. In FIG. 9, the X direction, the Y direction and the Z direction are shown, and the extending direction 5 of the arm of the driver P is also shown.

Figure 9A:
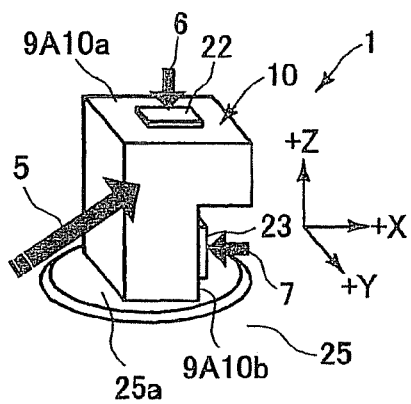
FIG. 9A is a diagram showing an orthogonal joystick type remote control device.

In FIG. 9A, the operation input device for the vehicle is a joy stick type remote control device 1. The arrangement position of the joy stick type remote control device 1 is the same as in FIG. 1. The device 1 includes an operation body 10 having a stick shape. The body 10 is inserted into an opening 25a on an upper surface of the case 25. A top of the body 10 is bent in the +X direction (i.e., the front direction of the vehicle) so that the body 10 has a L shape. The operation body 10 is swingably supported on the upper surface in the case. The joy stick type remote control device 1 is operated swingably on the upper surface. When the body 10 is operated, the cursor displayed on the operation screen of the display unit is moved to a position according to the operation direction of the body 10. Alternatively, the operation screen of the display unit is scrolled according to the operation of the body 10.

The enter switch 22 is arranged on the upper surface 9A10a of the operation body 10, which faces the +Z direction. The enter switch 22 is a push switch, and the driver P pushes the enter switch 22 in the −Z direction, i.e., a direction perpendicular to the upper surface 9A10a. Here, FIG. 9A shows the operation direction 6 of the enter switch 22.

The cancel switch 23 is arranged on the lower front side surface 9A10b, which faces the +X direction of the body 10. The cancel switch 23 is a push switch, which is pushed by the driver P in the direction perpendicular to the front side surface 9A10b, i.e., in the −X direction. FIG. 9A shows the operation direction 7 of the cancel switch 23.

Thus, in the remote control device 1 in FIG. 9A, the switches 22, 23 are arranged on the body 10 in such a manner that the operation direction 6 of the enter switch 22 is perpendicular to the operation direction 7 of the cancel switch 23. Since the operation direction 7 of the cancel switch 23 is opposite to the extending direction 5 of the left arm of the driver, the erroneous operation of the cancel switch 23 is restricted. Here, the extending direction 5 includes the +X directional component, and the operation direction 7 is the −X direction.

Figure 9D:
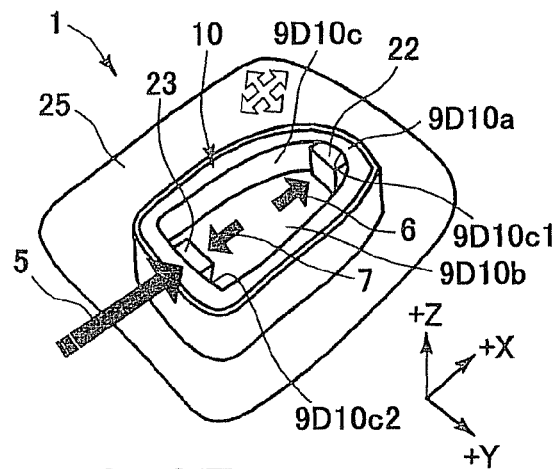
FIG. 9D is a diagram showing a inside-groove commander type remote control device.
Figure 9B:
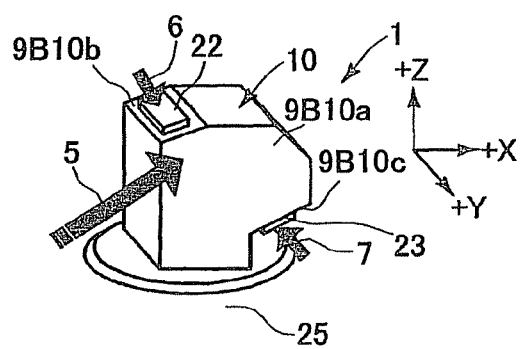
FIG. 9B is a diagram showing a facing joystick type remote control device.

In FIG. 9B, the operation input device for the vehicle is a joy stick type remote control device 1. In the device 1 in FIG. 9B, the arrangement of the enter switch 22 and the cancel switch 23 and the shape of the body 10 are different from FIG. 9A.

The operation body 10 includes a bending portion 9B10a, a top of which is bent toward the +X direction. An upper surface 9B10b of the bending portion 9B10a provides a slope surface, which is slant to face both of the rear side and the upper side of the vehicle so that a normal line of the slope surface includes a −X directional component and a +Z directional component. The enter switch 22 is arranged on the upper surface 9B10b. The enter switch 22 is a push switch, which is pushed in a direction perpendicular to the upper surface 9B10b, i.e., in the oblique direction having the +X directional component and the −Z directional component. Here, FIG. 9B shows the operation direction 6 of the enter switch 22.

A lower surface 9B10c of the bending portion 9B10a is a slope surface, which is slant to face both of the front side and the lower side of the vehicle so that a normal line of the slope surface includes a +X directional component and a −Z directional component. The cancel switch 23 is arranged on the lower surface 9B10c. The cancel switch 23 is a push switch, which is pushed in a direction perpendicular to the lower surface 9B10c, i.e., in the oblique direction having the −X directional component and the +Z directional component. Here, FIG. 9B shows the operation direction 7 of the cancel switch 23.

Thus, in the remote control device 1 in FIG. 9B, the enter switch 22 and the cancel switch 23 are arranged on the upper surface 9B10b and the lower surface 9B10c, respectively, which face each other. The operation direction 6 of the enter switch 22 and the operation direction 7 of the cancel switch 23 are opposite to each other. Since the operation direction 7 of the cancel switch 23 is opposite to the extending direction 5 of the left arm of the driver P, the erroneous operation of the cancel switch 23 is restricted. The extending direction 5 includes the +X directional component and the −Z directional component. The operation direction 7 includes the −X directional component and the +Z directional component.

Figure 10:
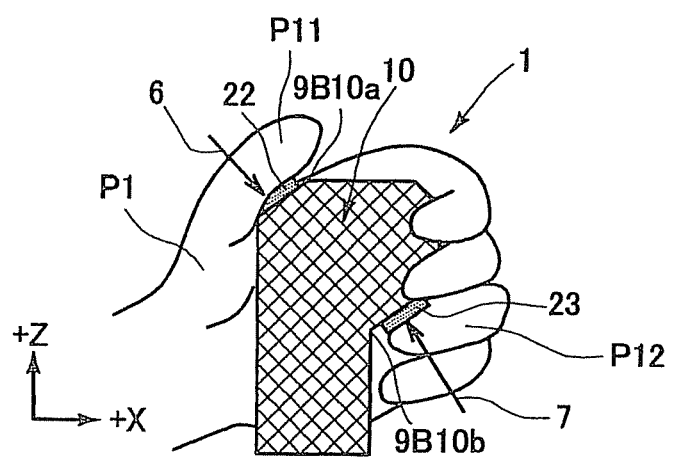
FIG. 10 is a diagram showing a state of the facing type remote control device in FIG. 9B such that a left hand of a user grips the control device.

FIG. 10 shows a state of the facing joystick type remote control device in FIG. 9B such that a left hand of a user grips the control device 1 when the driver operates the remote control device 1. Since the enter switch 22 and the cancel switch 23 are arranged in the above manner, the driver P operates the enter switch 22 with a thumb P11, and the driver P operates the cancel switch 23 with a ring finger or a little finger P12.

Figure 9E:
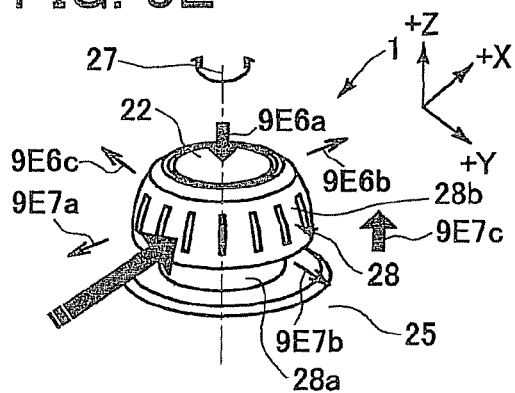
FIG. 9E is a diagram showing a dial type remote control device.
Figure 9C:
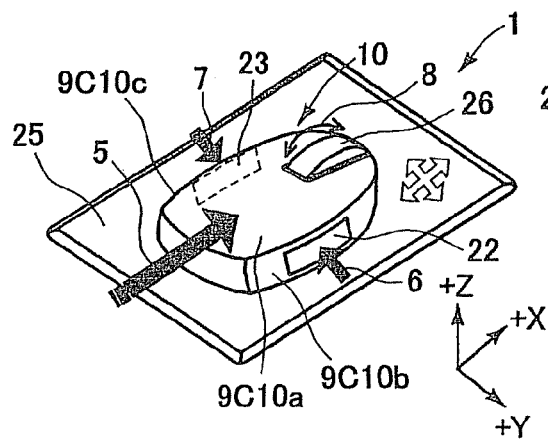
FIG. 9C is a diagram showing a commander type remote control device.

FIG. 9C shows the commander type remote control device 1. The control device 1 includes the commander type operation body 10 having a mouse shape. A shaft is connected to the lower surface of the body, and the shaft is inserted into the case 25. The shaft is movably supported in the case 25. The shaft is movable in the front-rear direction and the right-left direction. Thus, the operation body 10 is displaceable on a plan of the upper surface of the case 25. When the driver P grips the body 10, and operates, i.e., moves the operation body 10 on the upper surface 25, the cursor displayed on the operation screen of the display unit is displaced to a position according to the moving direction (i.e., the operation direction) of the body 10.

A scroll wheel 26 is formed on the upper surface 9C10a of the body 10 in the +Z direction. The scroll wheel 26 is rotatably supported around an axis in parallel to the Y axis. When the driver operates and rotates the scroll wheel 26, a screen of the display unit is scrolled. Here, FIG. 9C shows the operation direction 8 of the scroll wheel 26. The scroll wheel 26 corresponds to the first operation unit.

The enter switch 22 is formed on the right side surface 9C10b of the body 10, which faces the +Y direction. The enter switch 22 is a push switch, which is pushed in the direction perpendicular to the right side surface 9C10b, i.e., the −Y direction. FIG. 9C shows the operation direction 6 of the enter switch 22.

The cancel switch 23 is formed on the left side surface 9C10c of the body 10, which faces the −Y direction. The cancel switch 23 is a push switch, which is pushed in the direction perpendicular to the left side surface 9C10c, i.e., the +Y direction. FIG. 9C shows the operation direction 7 of the cancel switch 23.

In the remote control device 1 in FIG. 9C, since the operation direction 7 of the cancel switch 23 is opposite to the extending direction 5 of the left arm of the driver, the erroneous operation of o the cancel switch 23 is restricted. Here, the extending direction 5 has the −Y directional component, and the operation direction 7 is the +Y direction.

FIG. 9D shows a inside-groove commander type remote control device 1. In the device in FIG. 9D, the shape of the body 10 and the arrangement of the enter switch 22 and the cancel switch 23 are different from FIG. 9C.

As shown in FIG. 9D, the body 10 includes the upper surface 10a having a groove. Specifically, the groove 9D10b surrounded with an inner wall 9D10c in parallel to the Z axis is formed on the upper surface 9D10a of the body 10. The enter switch 22 is formed on a rear surface 9D10c1 of the inner wall 9D10c on a front side of the vehicle, which faces the −X direction. The enter switch 22 is a push switch, which is pushed in the direction perpendicular to the rear surface 9D10c1, i.e., in the +X direction. FIG. 9D shows the operation direction 6 of the enter switch 22.

The cancel switch 23 is formed on a front surface 9D10c2 of the inner wall 9D10c of the groove 9D10b, which faces the +X direction. The cancel switch 23 is a push switch, which is pushed in the direction perpendicular to the front surface 9D10c2, i.e., in the −X direction. FIG. 9D shows the operation direction 7 of the cancel switch 23.

Thus, in the remote control device 1 in FIG. 9D, since the operation direction 7 of the cancel switch 23 is opposite to the extending direction of the left arm of the driver, the erroneous operation of the cancel switch 23 is restricted. Here, the extending direction has the +X directional component, and the operation direction 7 is the −X direction.

FIG. 9E shows a dial type remote control device 1. As shown in FIG. 9E, the remote control device 1 includes a dial knob 28 having a cylindrical shape. A base 28a of the knob 28 is inserted into the case 25. The base 28a is rotatably supported around a rotational shaft 27 in parallel to the Z axis. Further, the base 28a is slidably supported on the upper surface of the case 25, which is perpendicular to the Z axis. Further, a top 28b of the knob 28 has a diameter of the cylindrical shape, which is larger than the base 28a. The driver grips the knob 28 easily. The enter switch 22 is formed in the cylindrical shape of the knob 28. The enter switch 22 is a push switch, which is pushed in the axial direction of the knob 28, i.e., the −Z direction. FIG. 9E shows the operation direction 6a of the enter switch 22.

Thus, in the remote control device 1, when the driver rotates and operates the knob 28, the operation of the in-vehicle device is executed according to the rotation direction and the rotation amount of the knob 28. Here, the operation of the in-vehicle device is, for example, to increase the volume of the in-vehicle device or to reduce the volume of the in-vehicle device. When the driver slides the knob 28, an operation equivalent to the operation of the enter switch (i.e., the determination operation) or an operation equivalent to the operation of the cancel switch (i.e., the cancel operation) is executed according to the operation direction of the knob 28. Specifically, when the knob 28 is operated in the operation direction equal to the extending direction of the left arm of the driver as shown in FIG. 9E, the determination operation is performed. Here, the operation direction equal to the extending direction is, for example, the operation direction 9E6b facing the +X direction and the operation direction 9E6c facing the −Y direction. Here, when the driver pushes the enter switch 22, which is arranged in the knob 28, the determination operation is executed. When the knob 28 is operated in the operation direction opposite to the extending direction of the left arm of the driver as shown in FIG. 9E, the cancel operation is performed. Here, the operation direction opposite to the extending direction is, for example, the operation direction 9E7a facing the −X direction and the operation direction 9E7b facing the +Y direction.

Thus, in the device 1 in FIG. 9E, since the operation direction of the knob 28 for executing the cancel operation is opposite to the extending direction of the left arm of the driver, the erroneous operation of the cancel operation is restricted.

Here, the knob 28 may be pulled up. When the driver pulls up the knob 28, the cancel operation is executed. In this case, the operation direction 9E7c is the +Z direction. Thus, the operation direction 9E7c is opposite to the extending direction of the left arm of the driver. Here, the knob 28 corresponds to the first operation unit and the second operation unit.

Figure 9F:
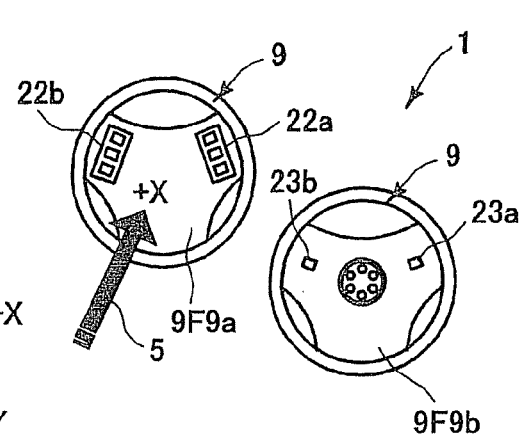
FIG. 9F is a diagram showing a steering type remote control device, according to other modifications of the example embodiment.

FIG. 9F shows a steering type remote control device 1. The device 1 has an operation body, which is provided by a steering wheel of the vehicle. In FIG. 9F, a front side 9F9a of the steering wheel 9 and a rear side 9F9b of the steering wheel 9 are shown. The front side 9F9a faces a face of the driver, and the rear side 9F9b is opposite to the front side 9F9a. Two enter switches 22a, 22b are formed on the front side 9F9a at right and left sides of the steering wheel 9, respectively. Each of the enter switches 22a, 22b is a push switch, which is pushed in the direction perpendicular to the front side 9F9a, i.e., in the substantially +X direction. Two cancel switches 23a, 23b are formed on the rear side 9F9b at right and left sides of the steering wheel 9, respectively. Each of the cancel switches 23a, 23b is a push switch, which is pushed in the direction perpendicular to the rear side 9F9b, i.e., in the substantially −X direction.

Thus, in the remote control device 1 in FIG. 9F, since the operation direction of each of the cancel switches 23a, 23b is opposite to the extending direction of the left arm of the driver, the erroneous operation of the cancel switches 23a, 23b is restricted. Here, the extending direction has the +X directional component. The operation direction is the −X direction.

(3rd Modification)

Figure 11A:
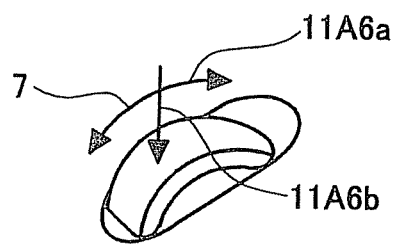
FIG. 11A is a diagram showing a scroll wheel type enter switch or a cancel switch.

In the above embodiments, the enter switch and the cancel switch are push switches, which are pushed down. Alternatively, even when the enter switch and the cancel switch may be different from the push switches. FIG. 11A shows a scroll wheel type enter switch or a cancel switch. The scroll wheel type switch is rotatably operated around a shaft. Further, the switch is pushed down as a push switch. In a case where the enter switch and the cancel switch are provided by a scroll switch, the scroll switch functions as the enter switch when the scroll switch is rotated in the +X direction as the operation direction 11A6a, or when the scroll switch is pushed down in the −Z direction as the operation direction 11A6b, as shown in FIG. 11A. The scroll switch functions as the cancel switch when the scroll switch is rotated in the −X direction as the operation direction 7, as shown in FIG. 11A.

Figure 11B:
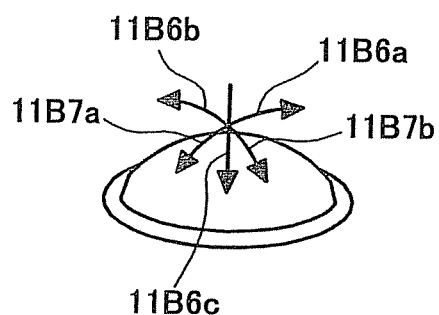
FIG. 11B is a diagram showing a track ball type enter switch or a cancel switch.

FIG. 11B shows a track ball type enter switch or a cancel switch. The switch is rotatable in a whole of directions. Further, the switch is pushed down. In a case where the enter switch and the cancel switch are provided by a track ball type switch, the switch functions as the enter switch when the switch is rotated in the +X direction as the operation direction 11B6a, when the switch is rotated in the −Y direction as the operation direction 11B6b, or when the switch is pushed down in the −Z direction as the operation direction 11B6c, as shown in FIG. 11B. The switch functions as the cancel switch when the switch is rotated in the −X direction as the operation direction 11B7a, or when the switch is rotated in the +Y direction as the operation direction 11B7b, as shown in FIG. 11B.

Figure 11C:
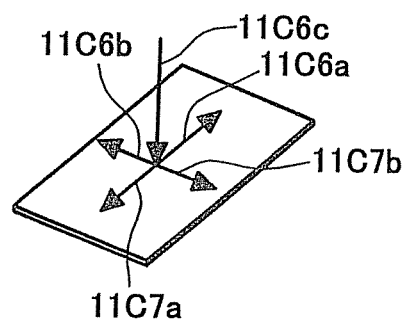
FIG. 11C is a diagram showing a touch pad type enter switch or a cancel switch, according to other modifications of the example embodiment.

FIG. 11C shows a touch pad type enter switch or a cancel switch. The switch is slidable on the surface of the switch. Further, the switch is pressed in the vertical direction. In a case where the enter switch and the cancel switch are provided by a touch pad type switch, the switch functions as the enter switch when the switch is slid in the +X direction as the operation direction 1106a, when the switch is slid in the −Y direction as the operation direction 1106b, or when the switch is pressed down in the −Z direction as the operation direction 1106c, as shown in FIG. 11C. The switch functions as the cancel switch when the switch is slid in the −X direction as the operation direction 11C7a, or when the switch is slid in the +Y direction as the operation direction 11C7b, as shown in FIG. 11C.

Figure 12:
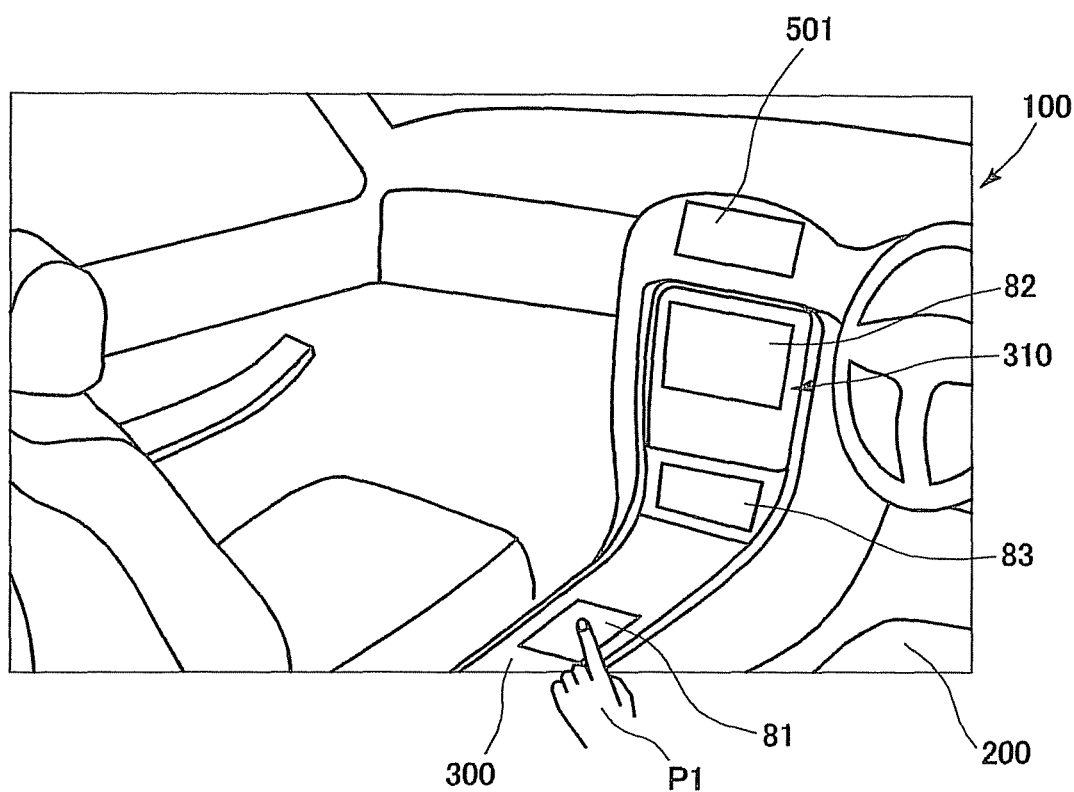
FIG. 12 is a diagram showing the touch pad in FIG. 11C in the compartment.

When the remote control device 1 is provided by the touch pad in FIG. 11C, an operation will be further explained. FIG. 12 shows the compartment 100, in which the touch pad 81 as the remote control device 1 is arranged. As shown in FIG. 12, the touch pad 81 is arranged on the center console 300. The display unit 501 of the navigation device 500 is arranged on the upper portion of the center panel 310. Operation panels 82, 83 of other in-vehicle devices such as an audio apparatus and an air conditioner are disposed on the center panel 310. Here, the touch pad 81 corresponds to the first and second operation units.

Figure 13A:
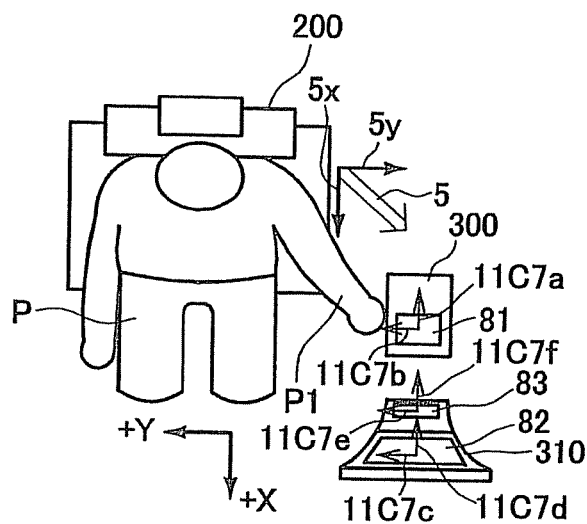
FIGS. 13A to 13C are diagrams showing an operational direction of each of the touch panel and an operation panel according to other modifications of the example embodiment.
Figure 13B:
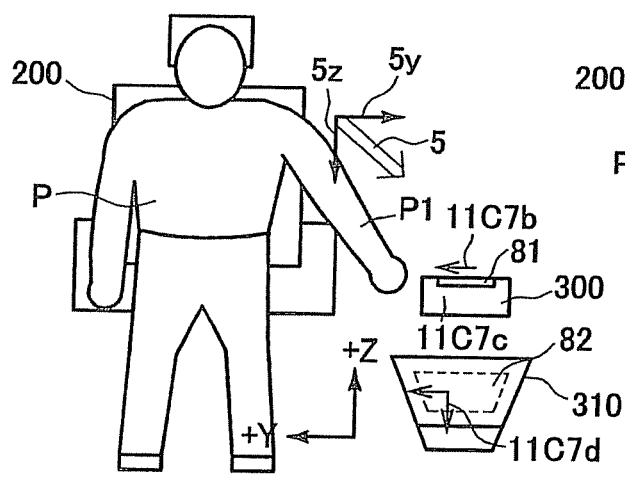
Figure 13C:
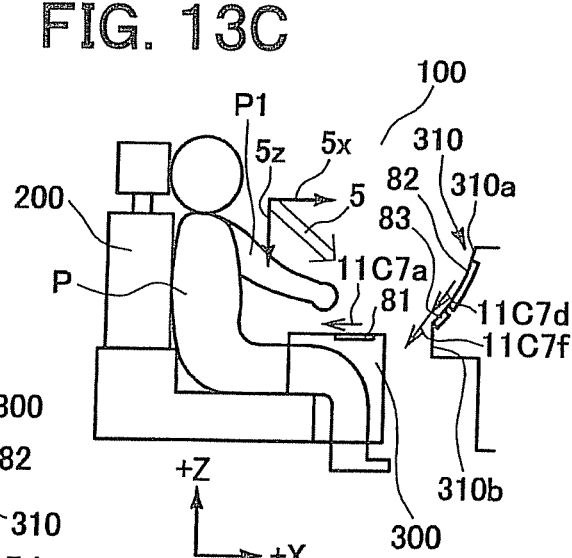

When the driver slides the left hand on the touch pad 81, the driver controls the in-vehicle device. In this case, when the sliding direction of the left hand as the operation direction is opposite to the extending direction of the left arm of the driver toward the touch pad 81, the cancel operation, i.e., the negative operation of the in-vehicle device is performed. As shown in FIGS. 13A to 13C, the operation direction of the touch pad 81 for executing the cancel operation will be explained as follows. FIGS. 13A to 13C correspond to FIGS. 4A to 4C. FIGS. 13A to 13C show a relationship between the extending direction 5 of the left arm of the driver P and the operation direction of the touch pad 81. Here, the driver P sits down on the driver seat 200. FIGS. 13A to 13C show the operation panels 82, 83.

Similar to FIGS. 4A to 4C, the extending direction 5 of the left arm P1 includes the directional component 5x directing to the +X direction, the directional component 5y directing to the −Y direction and the directional component 5z directing to the −Z direction. For example, when the touch pad 81 is operated in the −X direction from the front side to the rear side of the vehicle, i.e., when the touch pad 81 is operated in the operation direction 11C7a, the cancel operation, i.e., the negative operation is executed. In this case, since the operation direction 11C7a is opposite to the extending direction 5 of the left arm P1, the erroneous operation of the device 1 is restricted.

Figure 14A:
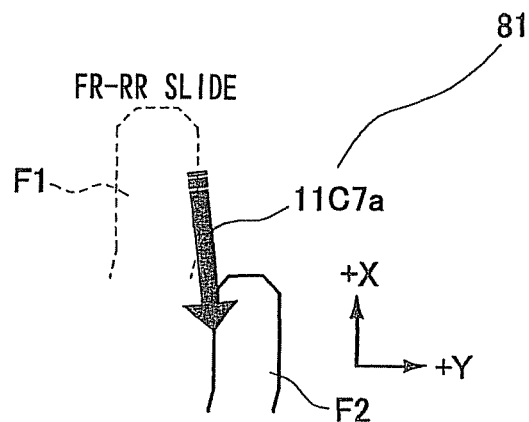
FIG. 14A to 14C are diagrams showing an operation of an operation screen when a touch pad is slid in a front-rear direction.
Figure 14B:
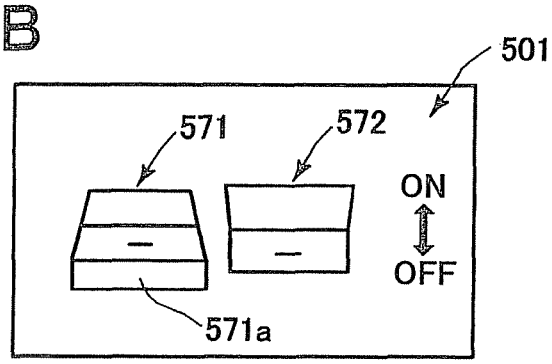
Figure 14C:
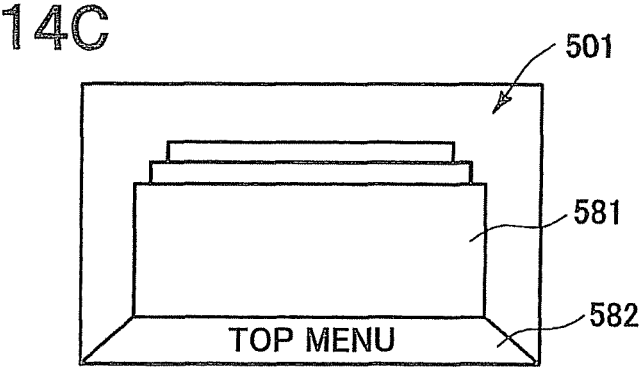

Here, FIGS. 14A to 14C show the operation screen displayed on the display unit 501 when the touch pad 81 is operated, and the operation of the operation screen when the touch pad 81 is operated in the operation direction 11C7a.

FIG. 14A shows the touch pad 81 viewing from the up side. FIG. 14A shows the operation direction 11C7a of the touch pad 81 when a finger of the driver P is slid from a position F1 to a position F2 on the touch pad 81. Here, the operation direction 11C7a is the −X direction. FIG. 14B shows the operation screen of the display unit 501. FIG. 14B shows the operation screen including the switch images 571, 572 for turning on and off a specific function of the in-vehicle device. Each switch image 571, 572 provides to turn on the specific function when the upper portion of the switch image 571, 572 is selected. Each switch image 571, 572 provides to turn off the specific function when the lower portion of the switch image 571, 572 is selected. When the driver P operates and directly touches the switch image 571, 572, or when the driver P slides on the touch pad 81, the driver P controls the in-vehicle device to turn on and off the specific function. For example, under a condition that the left side switch image 571 is operable, when the touch pad 81 is slid in the −X direction, as shown in FIG. 14A, the lower portion 571a of the switch image 571 is selected, as shown in FIG. 14B. As a result, the specific function of the in-vehicle device corresponding to the switch image 571 is off.

FIG. 14C shows an example of the operation screen displayed on the display unit 501. The operation screen includes multiple screen images, which are stacked in a direction perpendicular to the screen. Thus, the multiple screen images provide a hierarchical screen image 581. A top menu image 852 for returning to the top menu screen when selected, is disposed under the hierarchical screen image 581. When the driver P directly touches the top menu image 582, or when the driver P slides the touch pad 81 in the −X direction as shown in FIG. 14A, the top menu image 582 is selected.

In FIG. 13, when the touch pad 81 is operated in the +Y direction from the left side to the right side, i.e., in the operation direction 11C7b, the negative operation may be executed. In this case, since the operation direction 11C7b is opposite to the directional component 5y of the Y axis in the extending direction of the arm (which is the −Y direction), the erroneous negative operation is restricted.

Figure 15A:
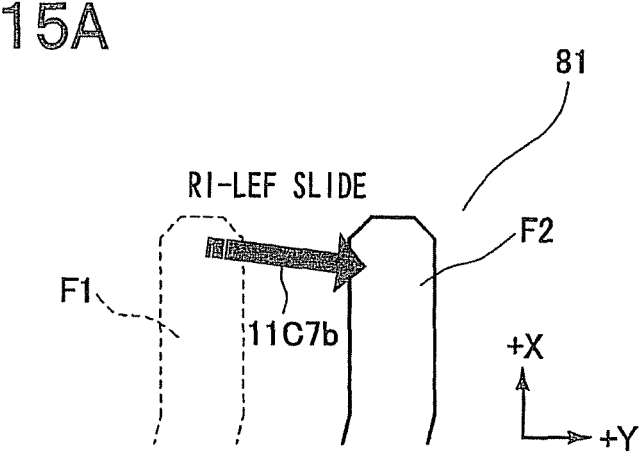
FIG. 15A to 15C are diaphragms showing an operation of an operation screen when a touch pad is slid in a right-left direction.
Figure 15B:
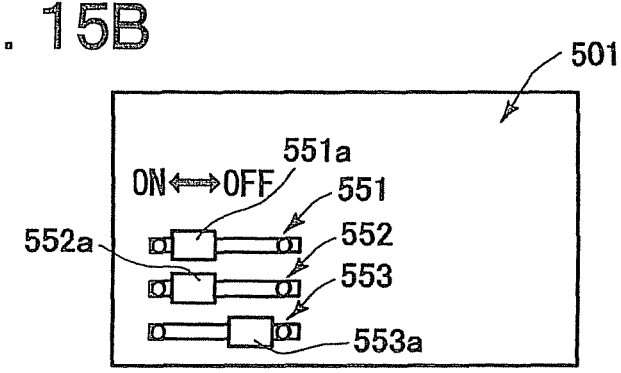
Figure 15C:
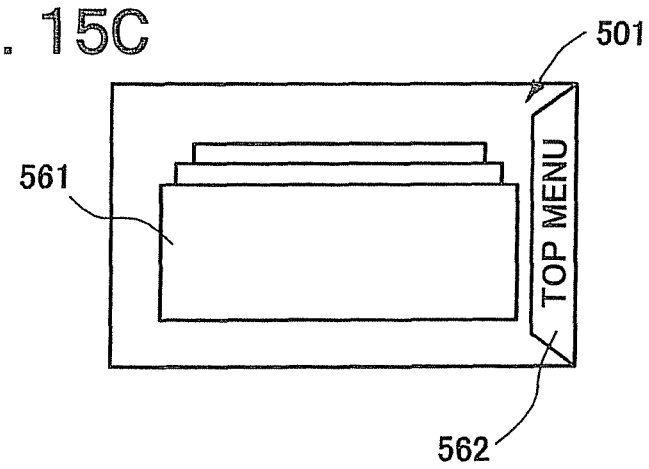

Here, FIGS. 15A to 15C show the operation of the operation screen displayed on the display unit 501 when the touch pad 81 is operated in the operation direction 11C7b. FIG. 15A shows the touch pad 81 viewing from the up side of the pad 81. FIG. 15A shows the operation direction 11C7b of the touch pad 81, which is the +Y direction, when the driver P slides a finger from the position F1 to the position F2. FIG. 15B shows an example of the operation screen including the switch images 551-553 for turning on and off a specific function of the in-vehicle device. Each switch image 551-553 includes a movable image 551a-553a, which is movable in the right-left direction of the image 551-553. Each switch image 551-553 provides to turn on a corresponding function when the movable image 551a-553a is disposed on the left side. When the movable image 551a-553a is disposed on the right side, the switch image 551-553 provides to turn off a corresponding function. When the driver P directly touches and slides the movable image 551a-553a in the right-left direction, or when the driver P slides the finger on the touch pad 81 in the right-left direction, the specific function of the in-vehicle device turns on or off. For example, under a condition that the lowest switch image 553 is operable, when the driver P slides the finger on the touch pad 81 in the +Y direction as shown in FIG. 15A, the movable image 553a of the switch image 553 is moved to the right side as shown in FIG. 15B. As a result, a function of the in-vehicle device corresponding to the switch image 553 turns off.

FIG. 15C shows an example of the operation screen of the display unit 501. FIG. 15C shows the hierarchical screen image 561, which includes multiple screen images stacked in the direction perpendicular to the screen image 561. The top menu image 562 is disposed on the right side of the hierarchical screen image 561. The top menu image 562 provides to return to the top menu when the top menu image 562 is selected. When the driver P directly touches the top menu image 562, or when the driver P slides the finger on the touch pad 81 in the +Y direction as shown in FIG. 15A, the top menu image 562 is selected.

(4th Modification)

In the above embodiments, the operation unit of the in-vehicle device is remotely operated by the remote control device 1. Alternatively, the operation unit of the in-vehicle device may be provided by the similar construction of the remote control device. Specifically, when the operation unit of the in-vehicle device is operated in the operation direction having a directional component opposite to the extending direction of the arm of the driver toward the operation unit, the negative operation, i.e., the cancel operation is executed. More specifically, the operation will be explained with using the operation panel 82, 83 arranged on the center panel 310, as shown in FIG. 12. As shown in FIG. 13C, the center panel 310 is slant so that the lower part 310$b$ of the center panel 310 protrudes to the compartment 100 toward the driver seat 200 more than the upper part 310$a$ of the panel 310. Thus, the operation panels 82, 83 are also slant. Each of the operation panels 82, 83 includes a touch panel and mechanical operation unit such as a push switch. When the driver touches the touch panel, an operation signal is input. For example, when the operation panel 82, 83 is operated in the +Y direction 11C7$c$, 11C7$e$ from the left side to the right side, the corresponding in-vehicle device executes the negative operation. Thus, since the operation direction 11C7$c$, 11C7$e$ is opposite to the directional component 5$y$ of the Y axis in the extending direction 5 of the left arm P1 of the driver P, the erroneous operation is restricted.

For example, when the operation panel 82, 83 is operated in the operation direction 11C7$d$, 11C7$f$, which directs from the up side to the down side of the panel 82, 83, the corresponding in-vehicle device executes the negative operation. In this case, since the operation panel 82, 83 is tilted, the operation direction 11C7$d$, 11C7$f$ of the operation panel 82, 83 has the $-X$ directional component and the $-Z$ directional component. Thus, since the operation direction 11C7$d$, 11C7$f$ is opposite to the directional component 5$x$ of the X axis of the extending direction 5 of the left arm P1, the erroneous operation is restricted.

Here, the operation panel 82, 83 corresponds to the operation input device for the vehicle. Further, the operation panel 82, 83 corresponds to the first and second operation units.

(5th Modification)

Figure 16:
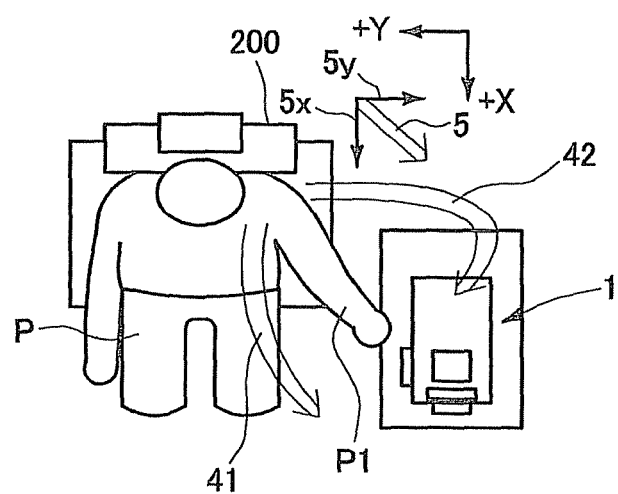
FIG. 16 is a diagram showing an operational direction of the user when the user extends an arm and touch the remote control device.

In the above embodiments, the extending direction of the left arm of the driver P when the driver P extends the arm to touch the operation input device is a straight linear direction. The extending direction may be different from the straight linear direction. FIG. 16 corresponds to FIG. 4A. FIG. 16 shows a case where the driver P extends the left arm P1 to touch the remote control device 1. As shown in FIG. 16, the extending direction of the arm P1 of the driver P may be a curved direction 41 or a pivoting direction 42 in addition to the straight linear direction 5. In the curved direction 41, the driver tries to touch the remote control device 1 with following a curved track. In the pivoting direction 42, the driver tries to touch the remote control device 1 with following a pivoting track. For example, when the remote control device 1 is disposed near the driver p, it is considered that the driver tries to touch the remote control device 1 with following a pivoting track. When the extending direction of the arm P1 is provided by the curved direction 41 and the pivoting direction 42 according to the arrangement position of the remote control device 1, the operation direction of the operation unit for executing the cancel operation may be determined to have a directional component opposite to the curved direction 41 and the pivoting direction 42. Thus, the extending direction of the arm of the user when the user tries to touch the operation input device includes the straight linear direction, the curved direction and the pivoting direction.

The above disclosure has the following aspects.

According to an aspect of the present disclosure, an operation input device for a vehicle arranged at a predetermined position of a compartment of the vehicle, the operation input device includes: a first operation unit for executing an operation of an in-vehicle device on the vehicle; and a second operation unit for executing a negative operation of the in-vehicle device so that the operation of the in-vehicle device is cancelled. An operation direction of the second operation unit has a directional component. The directional component of the operation direction of the second operation unit is opposite to an extending direction of an arm of a user, who sits down on a predetermined seat. The user extends the arm along with the extending direction in order to touch the operation input device.

In the above device, when the user operates the second operation unit, it is necessary to operate the second operation unit in the operation direction having the directional component opposite to the extending direction of the arm of the user. Thus, an erroneous operation of the second operation unit is restricted even when the user operates the second operation unit without watching the second operation unit or even when the user carelessly extends the arm. Accordingly, erroneous operation such that the executing operation suddenly stops, or the input letter is mistakenly deleted is restricted. Further, it is not necessary to increase the dimensions of the second operation unit and to change a protrusion amount of the second operation unit. Thus, operability and operation feeling of the second operation unit are improved.

Alternatively, the operation direction of the second operation unit may be different from an operation direction of the first operation unit. In this case, when the user operates one of the first and second operation units, the erroneous operation of the other of the first and second operation units is restricted.

Alternatively, the operation input device may be a remote control device arranged on a right side or a left side of the predetermined seat. The remote control device remotely controls the in-vehicle device. In this case, the user may operate the remote control device without watching the remote control device. Since the operation direction of the second operation unit is determined in the above manner, the erroneous operation is much restricted.

Alternatively, the directional component of the operation direction of the second operation unit may direct to a rear side of the vehicle. In this case, when the user operates the remote control device, the user extends the arm along a direction from the rear side to the front side of the vehicle. Accordingly, when the operation direction of the second operation unit has the directional component directing to the rear side of the vehicle, the operation direction of the second operation unit has the directional component opposite to the extending direction of the arm.

Alternatively, the directional component of the operation direction of the second operation unit may direct to the predetermined seat in a right-left direction of the vehicle. In this case, when the user operates the remote control device, the user extends the arm along a direction from the seat to the remote control device. Accordingly, when the operation direction of the second operation unit has the directional component directing to the seat of the vehicle, the operation direction of the second operation unit has the directional component opposite to the extending direction of the arm.

Alternatively, the directional component of the operation direction of the second operation unit may direct to an up side of the vehicle. In this case, when the user operates the remote control device, the user extends the arm along a direction from the upper side to the lower side of the vehicle. Accordingly, when the operation direction of the second operation unit has the directional component directing to the upper side of the vehicle, the operation direction of the second operation unit has the directional component opposite to the extending direction of the arm.

Alternatively, the operation input device may further include: a body, on which the first operation unit and the second operation unit are arranged. The second operation unit is disposed on a surface of the body, which does not face the predetermined seat. Thus, it is easy to set the operation direction of the second operation unit to have the directional component opposite to the extending direction of the arm. Since the second operation unit does not face the seat, the erroneous operation of the second operation unit is much restricted even when the user operates without watching or when the user carelessly extends the arm.

Alternatively, the first operation unit and the second operation unit may be disposed on a panel, which faces the compartment and is disposed at a position diagonally to a front of the predetermined seat. Further, the directional component of the operation direction of the second operation unit may direct to the predetermined seat. Thus, the operation direction has the directional component opposite to the extending direction of the arm.

Alternatively, the panel may be slant so that a lower part of the panel protrudes to the compartment toward the driver seat more than an upper part of the panel. The directional component of the operation direction of the second operation unit directs to the lower part of the panel. In this case, when the user extends the arm toward the panel, it is considered that the user extends the arm from the rear side to the front side of the vehicle. Since the lower part of the panel protrudes to the compartment toward the driver seat more than the upper part of the panel, the direction toward the lower part of the panel has the directional component directing to the rear side of the vehicle. Thus, the operation direction has the directional component opposite to the extending direction of the arm of the user.

Alternatively, the predetermined seat may be a driver seat, and the second operation unit is disposed on a backside of a steering wheel, which faces a bottom of the compartment. In this case, when the user extends the arm toward the steering wheel as the second operation unit, the user extends the arm from the rear side to the front side of the vehicle. When the second operation unit is disposed on the backside of the steering wheel, the operation direction easily includes the directional component opposite to the extending direction.

Alternatively, the operation input device may further include: a display controller. A display unit is disposed in the compartment. The display unit displays an operation image. The negative operation of the in-vehicle device is executed when an user selects the operation image. The display controller controls the display unit to display an arrow image accompanied with the operation image, and the arrow shows the operation direction of the second operation unit. In this case, the user easily recognizes the operation direction of the operation input device, i.e., the second operation unit when the operation image is selected.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An operation input device for a display unit of a vehicle arranged on a right side or a left side of a driver seat of a compartment of the vehicle, the operation input device comprising:
    a first operation unit for executing an operation of an in-vehicle device on the vehicle;
    a second operation unit for executing a negative operation of the in-vehicle device so that the operation of the in-vehicle device executed by the first operation unit is cancelled,
    a display controller; and
    a body,
    wherein the operation input device is a remote control device for remotely controlling the in-vehicle device,
    wherein an operation direction of the second operation unit has a directional component,
    wherein the directional component of the operation direction of the second operation unit is opposite to an extending direction of an arm of a user, who sits down on a driver seat,
    wherein the user extends the arm along the extending direction in order to touch the operation input device,
    wherein the operation direction of the second operation unit is opposite to an operation direction of the first operation unit,
    wherein the display unit is disposed in the compartment of the vehicle,
    wherein the display unit displays an operation image,
    wherein the negative operation of the in-vehicle device is executed when a user selects the operation image,
    wherein the operation image is selected when the user operates the second operation unit,
    wherein the display controller controls the display unit to display an arrow image accompanied with the operation image,
    wherein the arrow image shows the operation direction of the second operation unit, and is directed to the operation image,
    wherein the body includes an upper surface, a right side surface, a left side surface and a front side surface,
    wherein the first operation unit is an operation knob;
    wherein the operation knob is slidably disposed on the upper surface of the body,
    wherein the second operation unit is disposed on the right or left side surface opposite to the driver seat, or on the front side surface,
    wherein the first operation unit is spaced apart from the second operation unit; and
    wherein the first operation unit is disposed at a position different from the second operation unit.

2. The operation input device according to claim 1, wherein the directional component of the operation direction of the second operation unit directs to a rear side of the vehicle.

3. The operation input device according to claim 1, wherein the directional component of the operation direction of the second operation unit directs to the driver seat in a right-left direction of the vehicle.

4. The operation input device according to claim 1, wherein the directional component of the operation direction of the second operation unit directs to an up side of the vehicle.

5. The operation input device according to claim 1, wherein the second operation unit is disposed on a surface of the body, which does not face the driver seat.

6. The operation input device according to claim 1, wherein the second operation unit is disposed on a backside of a steering wheel, which faces a bottom of the compartment.

7. The operation input device according to claim 1 wherein the operation knob has a first directional component and a second directional component, the first directional component is opposite to the extending direction of the arm of the user, and the second directional component is same as the extending direction of the arm of the user.

8. The operation input device according to claim 1 wherein the display controller controls movement of the arrow image based on an operation of the operation knob.

9. The operation input device according to claim 1, wherein the body has a parabolic shape with a regress region.

10. The operation input device according to claim 1, wherein the body has a concavity, and wherein the operation knob is disposed on a bottom of the concavity.

11. The operation input device according to claim 1, wherein the first operation unit and the second operation unit are disposed on a panel, which faces the compartment and is disposed at a position diagonally to a front of the driver seat.

12. The operation input device according to claim 11, wherein the directional component of the operation direction of the second operation unit directs to the driver seat.

13. The operation input device according to claim 11, wherein the panel is slanted so that a lower part of the panel protrudes to the compartment toward the driver seat more than an upper part of the panel, and wherein the directional component of the operation direction of the second operation unit directs to the lower part of the panel.

14. An operation input device for a display unit of a vehicle arranged on a right side or a left side of a driver seat of a compartment of the vehicle, the operation input device comprising:

a display controller controlling the display unit, wherein the display unit is disposed in the compartment of the vehicle and displays an operation image, the display controller controls the display unit to display an arrow image accompanied with the operation image;

a body including an upper surface, a right side surface, a left side surface and a front side surface, wherein the body has a parabolic shaped region along the upper surface of the body, and the parabolic shaped region defines a cavity;

an operation knob operable to execute an operation of an in-vehicle device in the vehicle; and a second operation unit for executing a negative operation of the in-vehicle device so that the operation of the in-vehicle device executed by the operation knob is cancelled, wherein:

an operation direction of the second operation unit is opposite to an operation direction of the operation knob, the second operation unit is disposed along a surface of the body that is different than the upper surface of the body, the operation knob is disposed at a position different from the second operation unit, and the operation knob is disposed in the cavity of the parabolic shaped region along the upper surface of the body.

15. The operation input device according to claim 14 wherein the right side surface and the left side surface of the body have a nonlinear profile that extends a length of the upper surface.

16. The operation input device according to claim 15 wherein the second operation unit is disposed along one of the left side surface and the right side surface of the body.

* * * * *